(No Model.) 12 Sheets—Sheet 1.
J. C. SHARP.
STUMP EXTRACTOR.
No. 528,567. Patented Nov. 6, 1894.
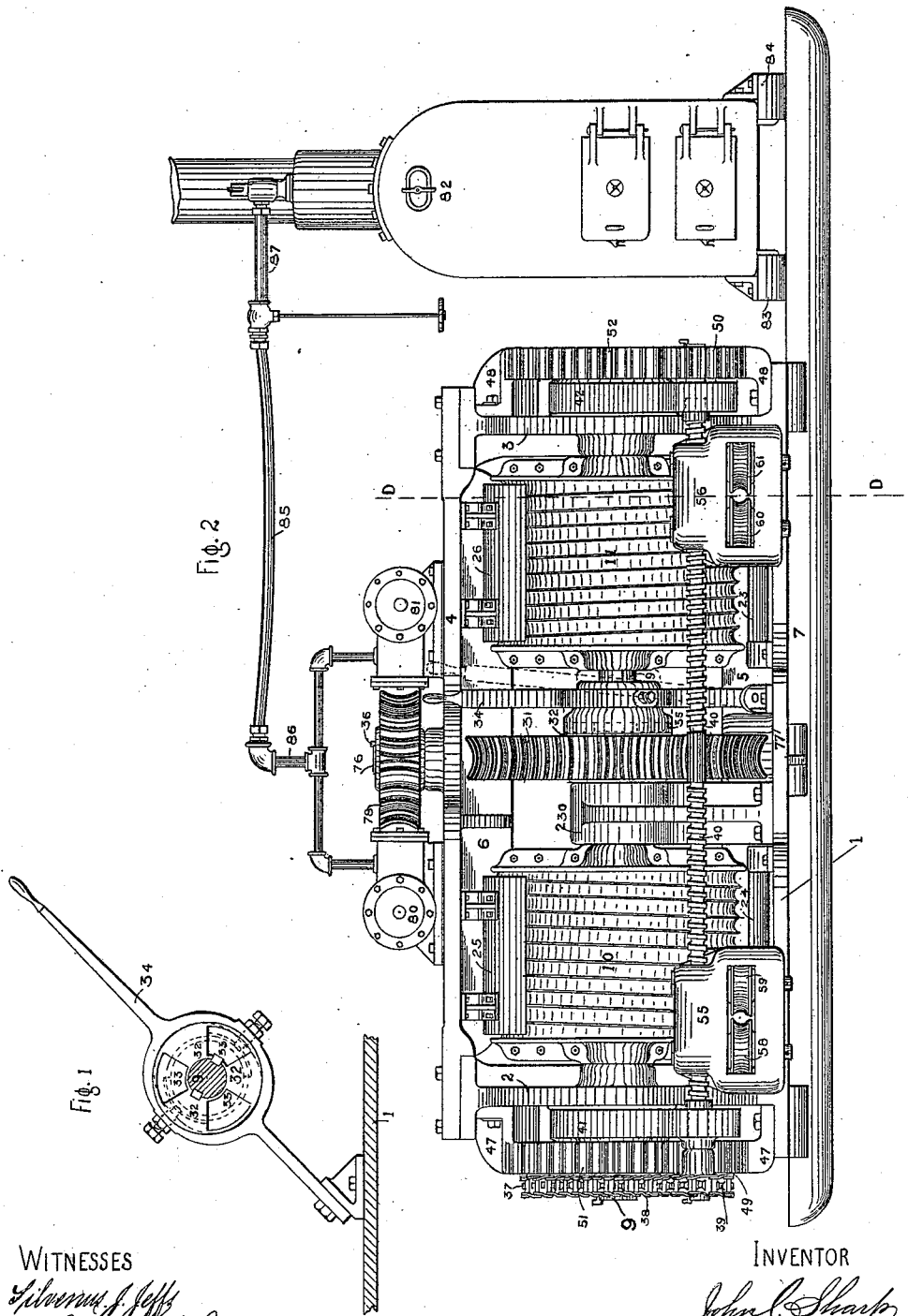
WITNESSES
INVENTOR

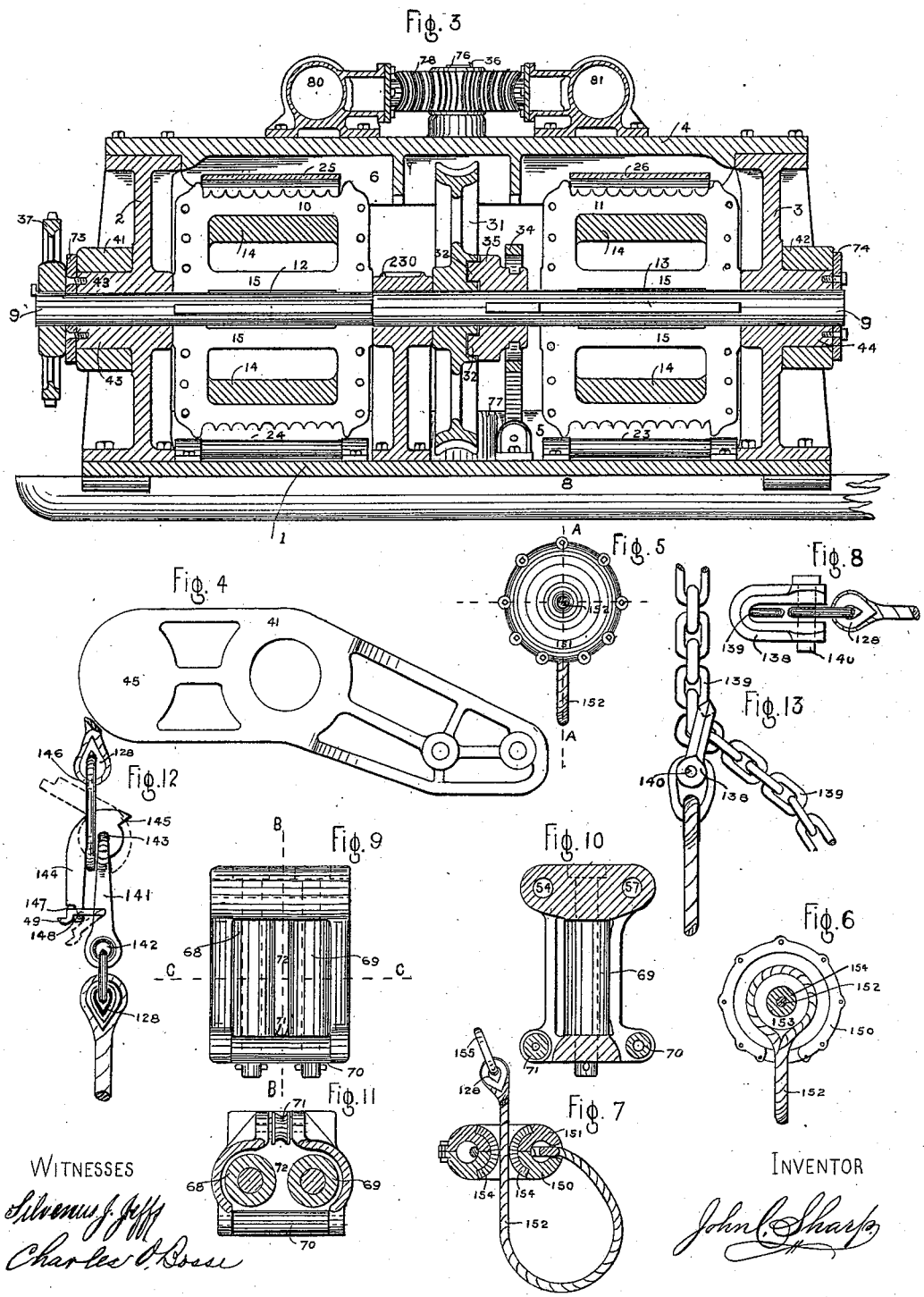

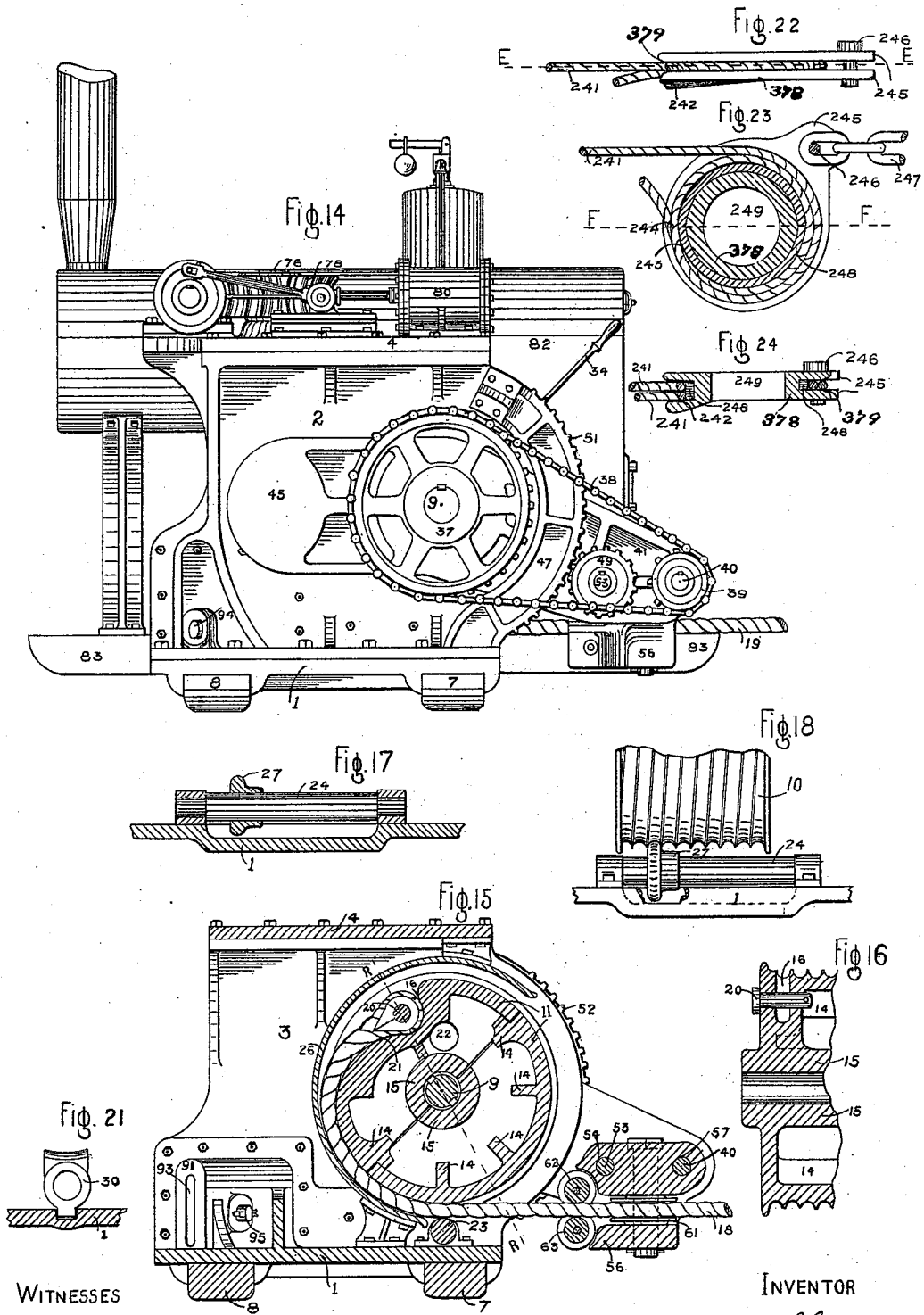

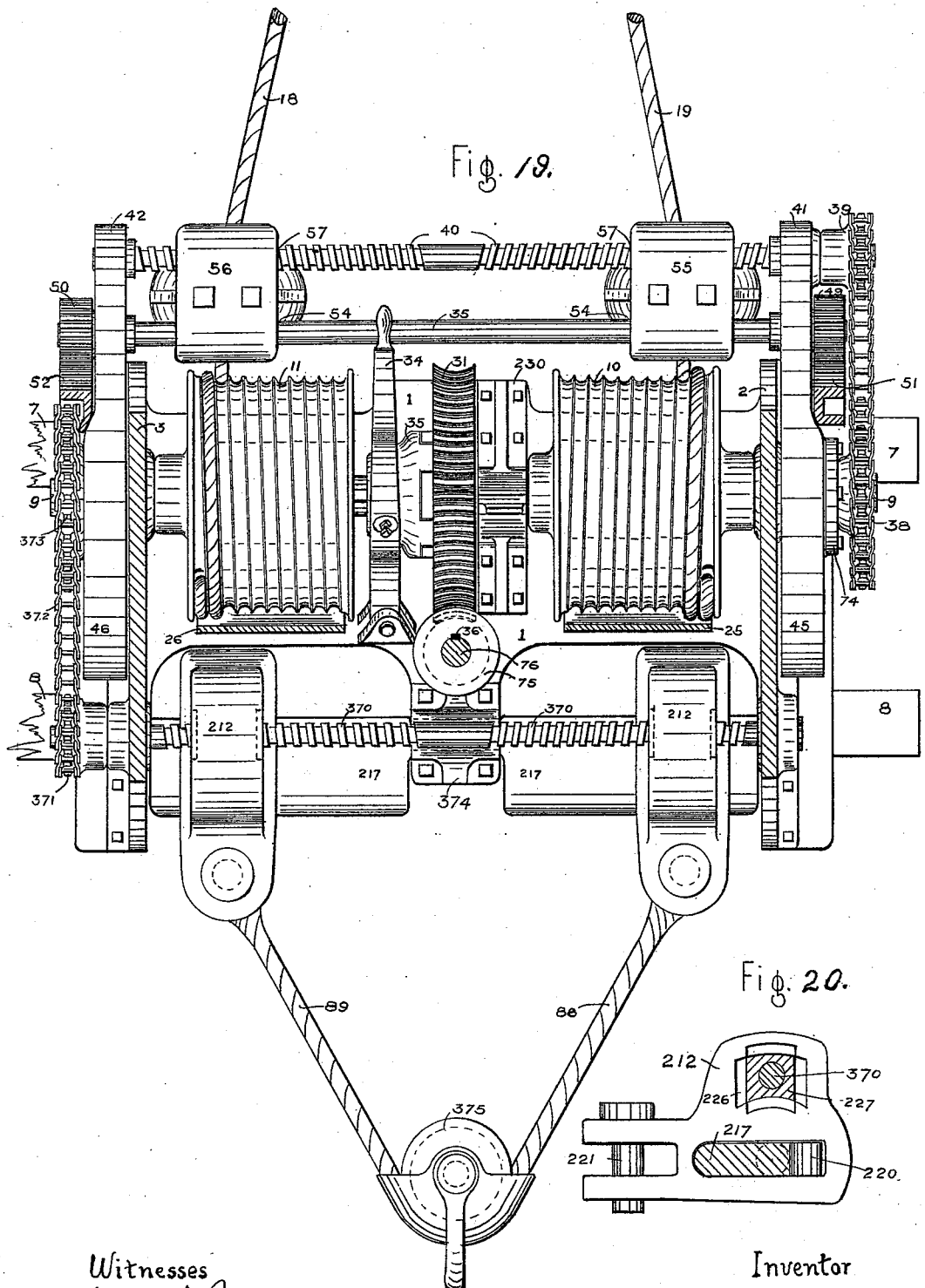

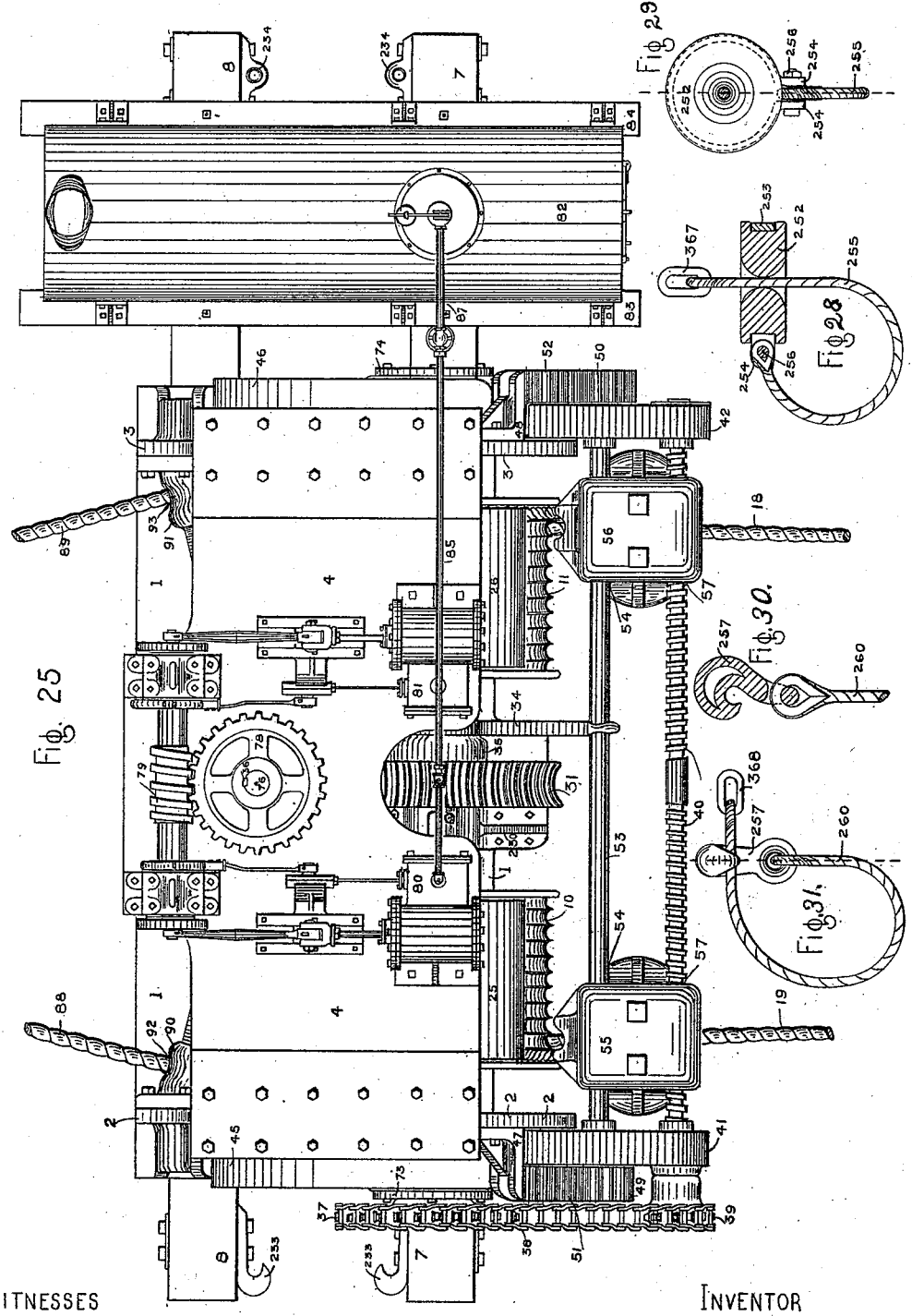

(No Model.) 12 Sheets—Sheet 6.
J. C. SHARP.
STUMP EXTRACTOR.
No. 528,567. Patented Nov. 6, 1894.
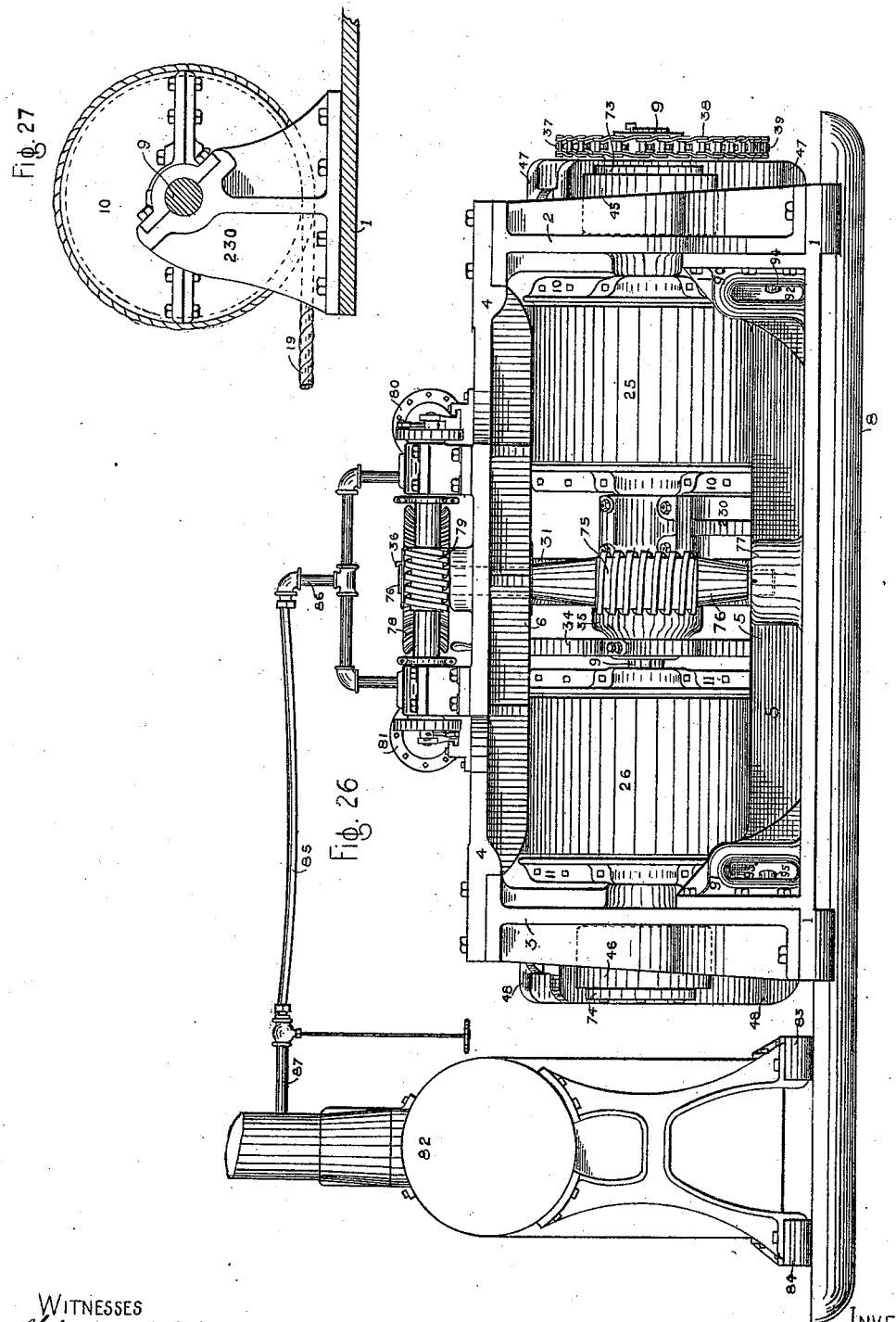
Witnesses
Inventor
John C. Sharp

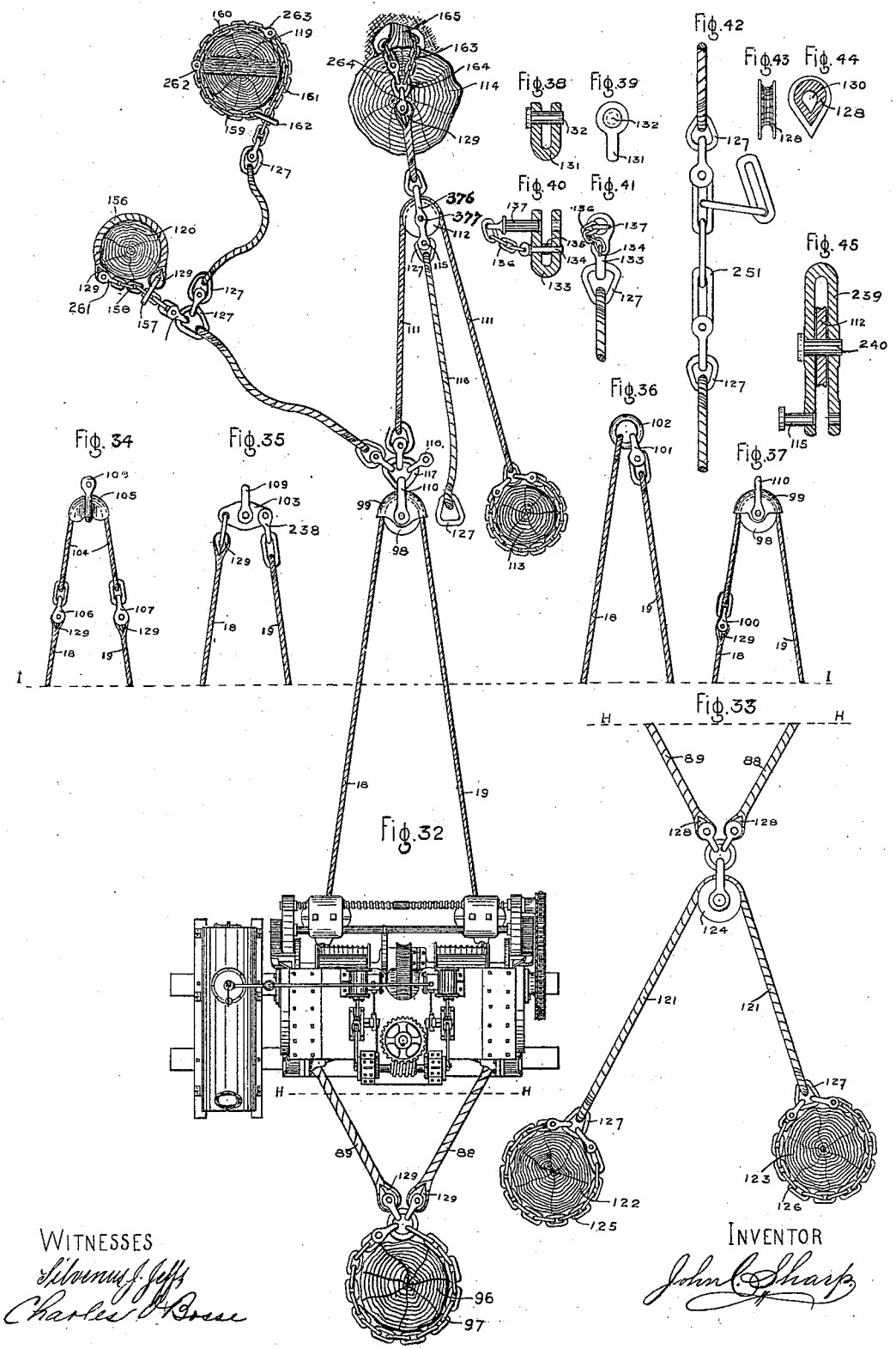

(No Model.) 12 Sheets—Sheet 8.
J. C. SHARP.
STUMP EXTRACTOR.
No. 528,567. Patented Nov. 6, 1894.
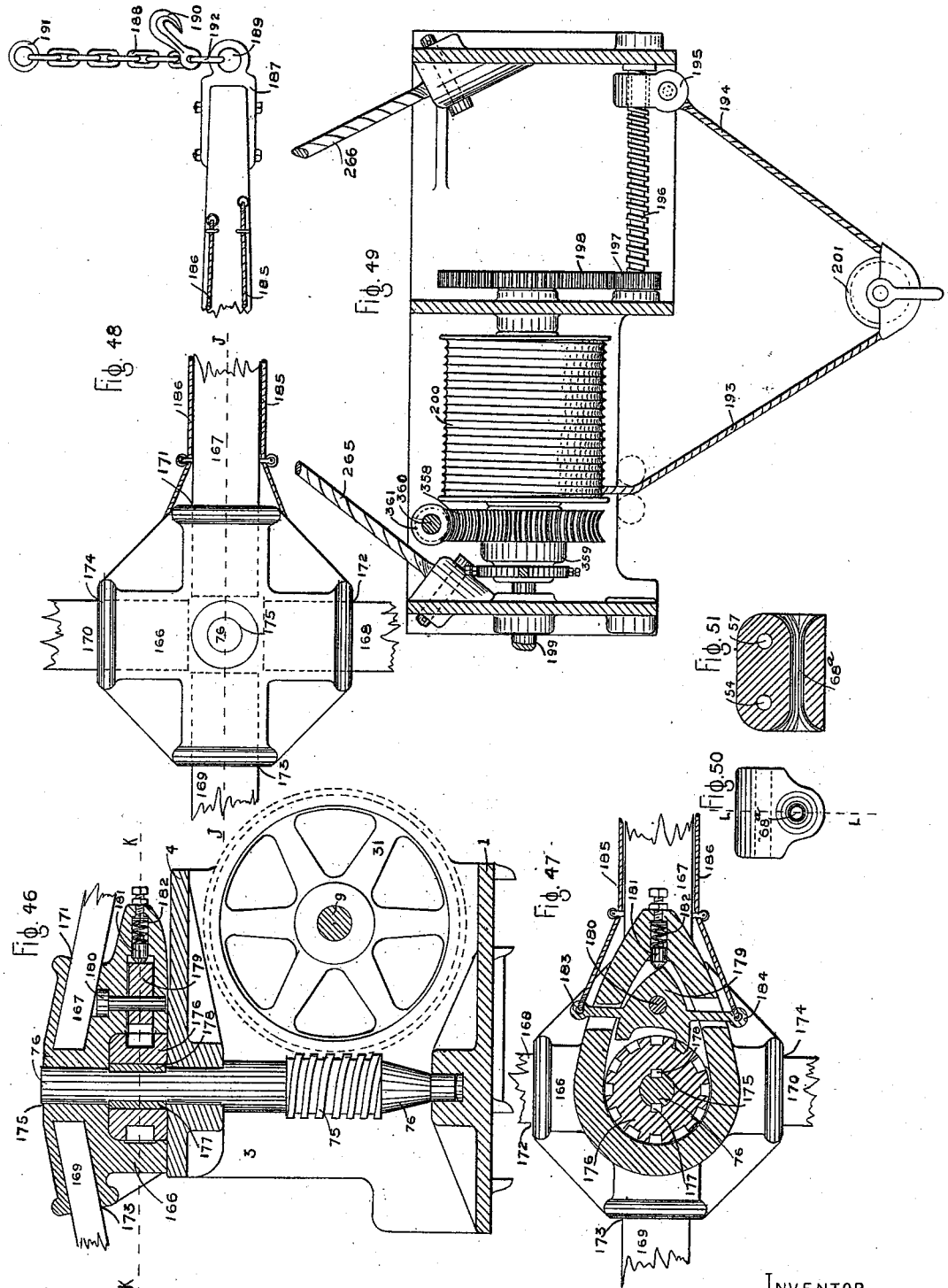
WITNESSES
INVENTOR

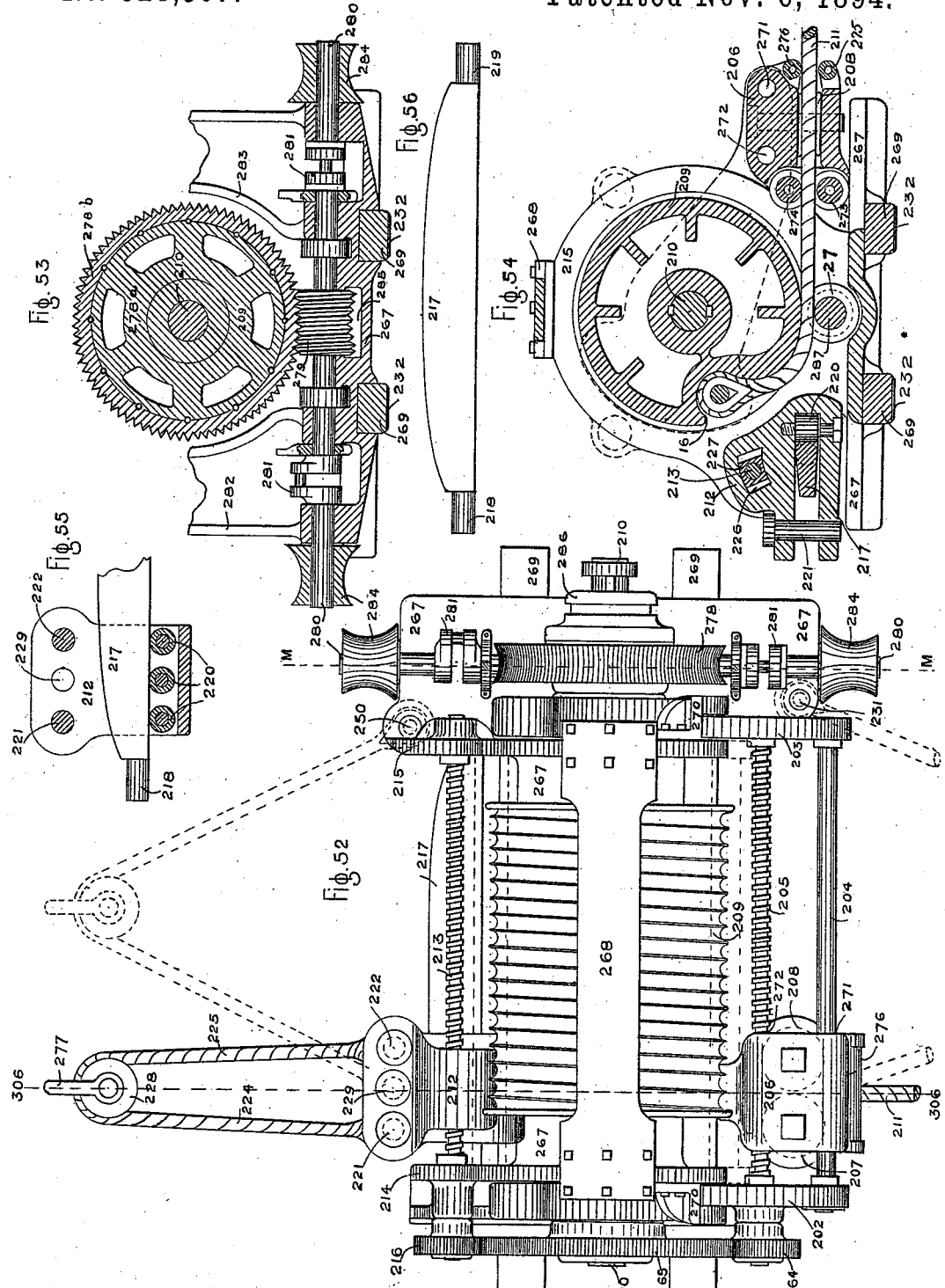

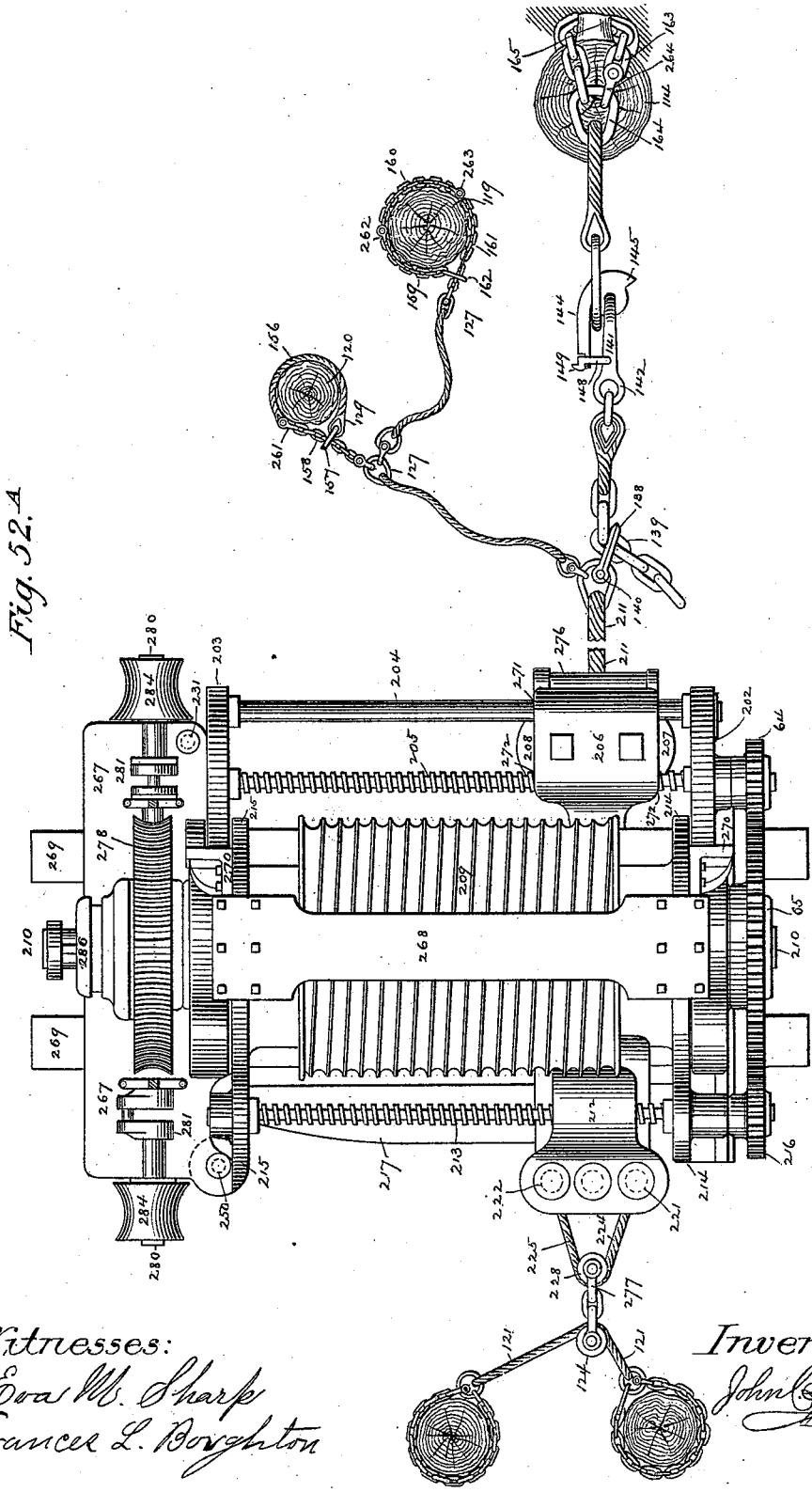

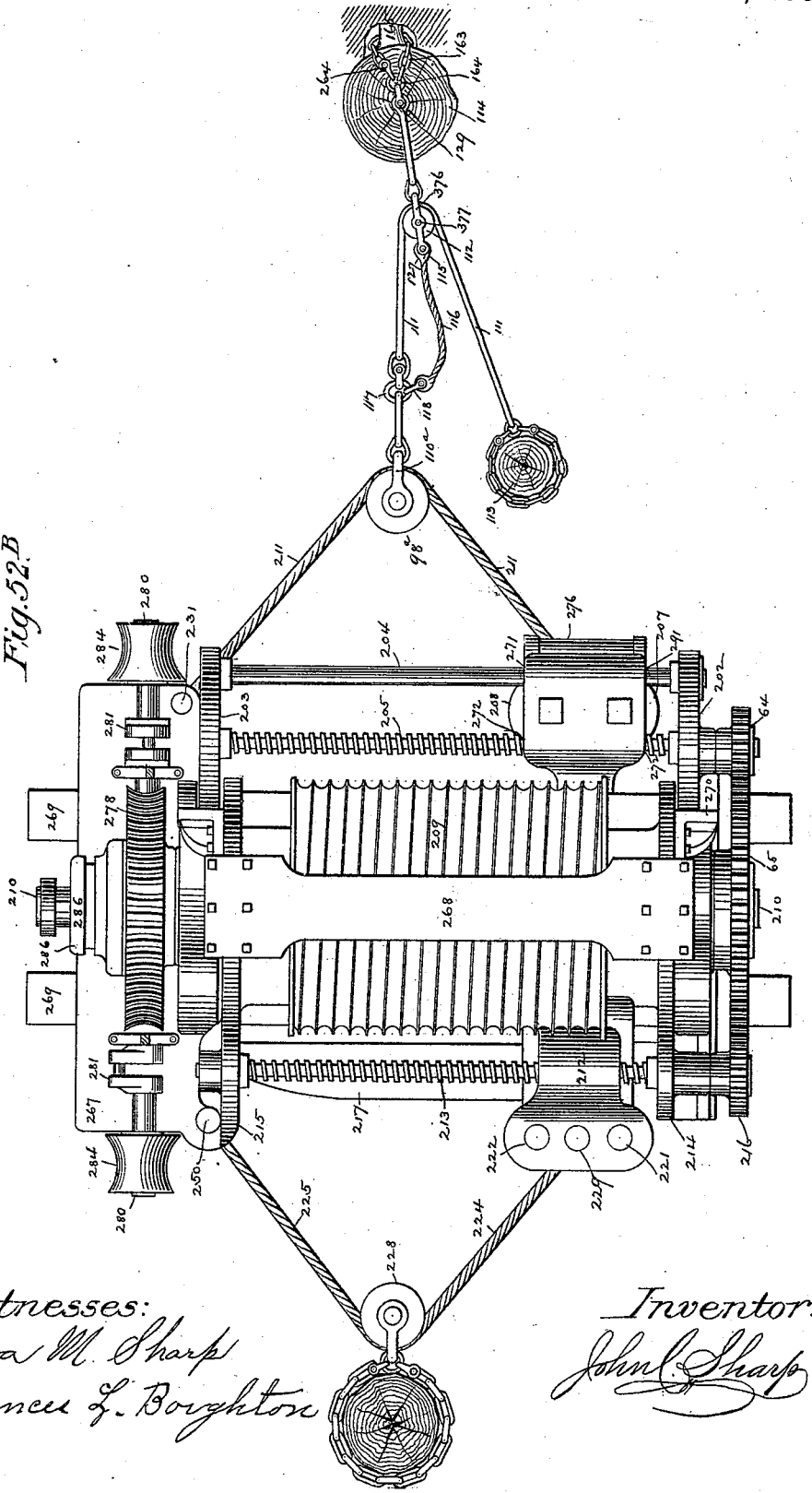

(No Model.) 12 Sheets—Sheet 12.
J. C. SHARP.
STUMP EXTRACTOR.
No. 528,567. Patented Nov. 6, 1894.
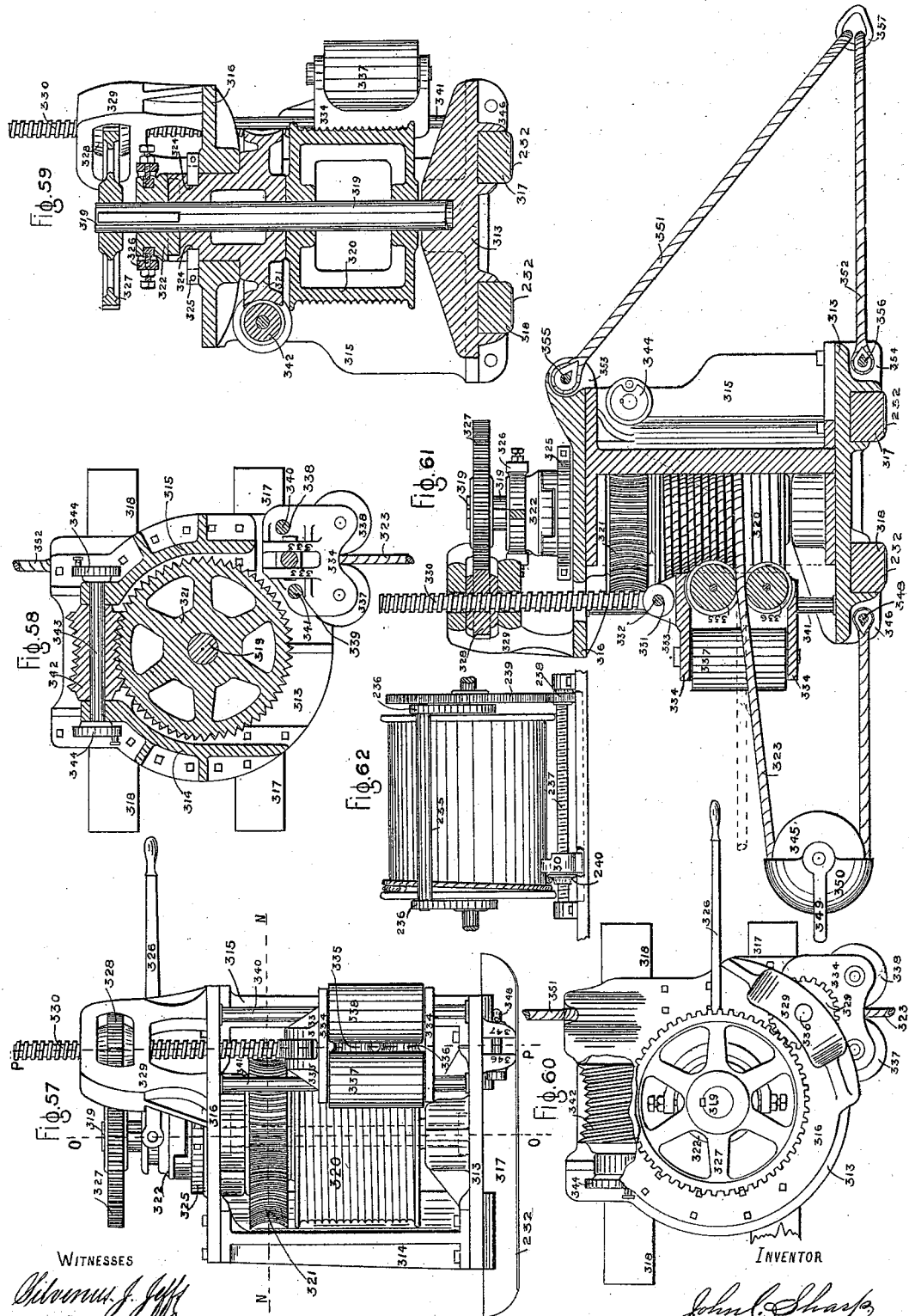
WITNESSES
INVENTOR

UNITED STATES PATENT OFFICE.

JOHN C. SHARP, OF DELAVAN, WISCONSIN.

STUMP-EXTRACTOR.

SPECIFICATION forming part of Letters Patent No. 528,567, dated November 6, 1894.

Application filed May 26, 1892. Serial No. 434,506. (No model.)

*To all whom it may concern:*

Be it known that I, JOHN C. SHARP, a citizen of the United States of America, and a resident of Delavan, Walworth county, Wisconsin, have invented certain new and useful Improvements in Stump-Extractors, of which the following is a specification.

In the accompanying drawings, illustrating my invention, Figure 1, is a side elevation of the clutch coupling 35, attached to the bed plate 1, a part of which bed plate is shown in cross section. Fig. 2, is a front elevation of my machine with its draft rope removed. Fig. 3, is a front view of a central longitudinal vertical section, showing in whole form the shaft 9, one-half of each of the winding drums 10 and 11, and the rope holding bars 23 and 24, and the boiler being removed. Fig. 4 is a side elevation of one of the side pieces of the pivoted frame in which the rope guide is mounted to slide, the number 45 indicating the weighted part of said side piece. Fig. 5, is a top view of a hitch rope hollow ring, showing a part only of the rope 152, which is fully shown in Fig. 7. Fig. 6, is a top view of said hitch rope hollow ring, the upper half thereof being removed, a part of the rope 152, being shown in cross section. Fig. 7, is a vertical cross sectional view of the said hitch rope hollow ring on line A, A, of Fig. 5. Fig. 8, is a side elevation of a grip clevis, showing an end view of one link only of the chain 139, also showing the grip clevis 138 connected with a section of the draft rope, or one of its extension ropes. Fig. 9, is a front elevation of a modified sliding draft rope guide with guide rollers mounted in the frame. Fig. 10, is a vertical sectional view on line B, B, in Fig. 9, showing circular openings 54 and 57, for the slide bar 53, and the screw threaded shaft 40, and also showing the vertically rotating auxiliary rope guide rollers 70, and 71. Fig. 11, is a top view of a horizontal section on line C, C, in Fig. 9. Fig. 12, is a side elevation of my improved fly-hook showing it applied in connecting two ropes, also showing in dotted lines the position of the confining link 148, and the lever or hook 144, when released. Fig. 13, is a top view of the grip clevis 138, showing it connected with a piece of chain, and a section of the draft rope or one of its extension ropes. Fig. 14, is a side elevation of my double winding drum machine. Fig. 15 is a vertical cross sectional view of my double winding drum machine on line D, D, in Fig. 2. Fig. 16, is a longitudinal vertical sectional view of a part of winding drum, to more clearly show the cross pin 20 and the recess 16, on line R, R, of Fig. 15. Fig. 17, is a longitudinal vertical sectional view of a part of the bed plate 1, and a section of the groove traveler 27, the rope holding bar 24, being shown in whole form. Fig. 18, is a front elevation of a part of a spirally grooved winding drum, also showing a groove traveler 27 and a rope holding bar 24, in position, at the bottom part of the drum. Fig. 19, is a side elevation of one of the said sliding anchor rope carriers, the bar 217, and the screw shaft 370, being shown in vertical cross section, and shows an anti-friction roller 220. Fig. 20, is a top view of my double winding drum machine, showing an anchor rope 88, 89, attached to sliding anchor rope carriers 212, 212. Fig. 21, is a side elevation of the draft rope confining device 30, which, to prevent rotation, has a tongue projecting into a groove in the bed-plate, in which groove it slides, the bed-plate being shown in broken cross section. Said draft rope confining device, is also shown in Fig. 62, mounted on its screw threaded shaft, which is placed in position, near the winding drum. Fig. 22, is a side elevation, or edgewise view, of a draft rope coupling device, used with the light wire ropes of a small machine, for pulling small stumps, the chain 247, shown in Fig. 23, not being shown in this view. Fig. 23, is a horizontal sectional view of the said draft rope coupling device on line E, E, of Fig. 22, the rope 241, being shown in whole form. Fig. 24, is a cross-sectional view of the said draft rope coupling device on line F, F, of Fig. 23, the chain 247, being removed. Fig. 25, is a top view of my double winding drum machine, showing a part only of the draft rope and anchor ropes. Fig. 26, is a rear view of one form of double winding drum machine, the anchor rope being removed. Fig. 27, is a side view of the bearing bracket 230, and an end view of the winding drum 10, a part of the bed-plate 1, and the shaft 9, being shown in vertical cross section, and with the top plate 4, and the side piece 2, removed. Fig. 28, is a central vertical cross sectional view of the hitch rope wooden ring, a top view of which ring is shown in Fig. 29, a part only of its rope being shown in Fig. 29. Fig. 30, is a longitudinal central vertical sectional view of a hitch rope hollow hook, a top view of said hook, with its rope attached, being shown in Fig. 31. Fig. 32, is a top view of the double winding drum machine, showing it in operation. Fig. 33, is a top view of my improved anchor rope 121, connected with sections of anchor ropes 88, and 89 which are cut on lines H, H, of Figs. 32 and 33. Figs. 34, 35, 36, and 37, are top views of modifications of the outer part of the draft rope 18, 19, cut on line I, I, of Fig. 32. Fig. 38, is a longitudinal central sectional view of the connecting clevis 131, a top view of which is shown in Fig. 39, and some connecting clevises of this kind are shown in other parts of the drawings and numbered:—106, 107, 238, 100, 101, 261, 262, 263, 264 and 118, and there are other clevises of this kind shown in the illustrations, that are not numbered. Fig. 40, is a longitudinal central sectional view of a connecting clevis 133, a top view of which is shown in Fig. 41. Fig. 42, shows a top view of a take-up chain 251, in use. Fig. 43, shows the rope groove of a thimble 128, which thimble is also shown in Fig. 44, which is a longitudinal central horizontal sectional view of Fig. 43. Fig. 45, is a longitudinal central vertical sectional view of my improved quick speed pulley block, which is shown in use in Figs. 32, and 52$^B$. Fig. 46, is a vertical sectional view of a draft lever socket on line J, J, of Fig. 48, and shows its mode of application to my double winding drum machine, the engines being removed from the top of the frame, and the teeth of the worm wheel being indicated by the dotted lines around the periphery. Fig. 47, is a longitudinal sectional view of the draft lever socket, on line K, K, in Fig. 46. Fig. 48, is a top view of said draft lever socket, showing the levers 167, 168, 169, and 170, in broken section. Fig. 49, is a plan view of a modification of my double winding drum machine, the top part of the frame being removed and the pivoted frame, sliding draft rope guide, and the gears for operating the draft rope guide, also removed, the position of the guide pulleys being indicated by dotted lines in circular forms. This view also shows a worm wheel 358, and a clutch coupling 359, with its lever or operating handle cut off, and also shows a part of the anchor ropes 265, 266, which in use are arranged in a similar manner to the anchor ropes 88 and 89 in Fig. 32. Fig. 50, shows a front elevation of another modified sliding draft rope guide. Fig. 51, is a cross sectional view of said modified sliding draft rope guide, on line L, L, in Fig. 50, and shows circular openings 57 and 54, for the slide bar 53, and the screw threaded shaft 40. Fig. 52, is a top view of a single winding drum modification of my double winding drum machine. Fig. 52$^A$, is a plan view of the single winding drum machine in operation, showing the grip clevis 138, and the fly-hook 144 in use, and also showing the slip-noose stump hitches composed of sections of a chafing chain and rope, and of chains. Fig. 52$^B$, is a plan view of said single winding drum machine in operation, also showing the quick speed pulley block in use, the draft rope 211, and anchor rope 224, 225 being arranged in a modified form from that shown in Fig. 52$^A$. Fig. 53, is a vertical sectional view of said single winding drum machine on line M, M, in Fig. 52; and Fig. 54, is a vertical sectional view of said single winding drum machine on line 306, 306 of Fig. 52. Fig. 55, is a central horizontal sectional view of the anchor rope carrier 212, showing the anchor rope 224, 225 removed, and showing the bar 217 in broken section. Fig. 56, is a top view of the rocking bar 217, shown removed from the machine. Fig. 57, is a machine having a vertical winding drum, and Fig. 58 is a horizontal sectional view of said vertical drum machine on line N, N, of Fig. 57, and Fig. 59 is a vertical sectional view of said machine on line O, O, in Fig. 57, and Fig. 60, is a top view of said machine, with a part of top plate broken away to show the worm 342, and Fig. 61, is a vertical sectional view of said machine on line P. P. in Fig. 57. Fig. 62, is a front elevation of a winding drum having a smooth or non-grooved winding surface and shows a draft rope holding bar 235, mounted in arms pivoted to the drum shaft, and also shows a draft rope confining device 30, with a rotating anti-friction wheel 240, both mounted on a screw threaded shaft 237, said device for confining the draft rope and causing its coils to wind closely to each other on the drum.

Like numerals of reference denote corresponding parts in all the figures except where different numbers are used to more clearly locate the particular part to which reference is made.

My invention relates to stump extractors, and particularly to that variety having a winding drum upon which the draft rope is wound.

The invention consists of certain details to be hereinafter described and claimed, the main features of which being means whereby the machine is automatically swung into the proper line of draft with its load, and whereby the draft rope is guided and held at all times in proper position upon the winding drum.

The main frame of my machine as well as the main frames of the several modifications thereof hereinbefore mentioned, may be constructed in any suitable number of pieces and in any simple manner or form adapted to accommodate the various parts of the machine to be placed therein or thereon and can be made of cast steel, iron or any other well known material or combination of such materials possessing the necessary strength to withstand the great strain to which, when in use, the main frames are subjected.

In this instance, the main frame of my machine is composed of a bed-plate 1, two side pieces 2 and 3, and a top-plate 4, all secured together by means of bolts. The bed-plate 1, and the top plate 4, are strengthened and stiffened by the longitudinal ribs 5 and 6, cast thereon and being best shown in Fig. 26. Said ribs 5 and 6, as well as other strengthening and stiffening ribs shown in the illustrations could be made in separate pieces and bolted, or riveted to their respective frame pieces, if the main frame should not be made of cast metal with side ribs cast thereon.

The main frame of my machine and also the main frames of the several modifications thereof hereinbefore mentioned, are preferably mounted upon and bolted to transverse runners 7 and 8, 317, 318, 269, 269, which can be made of wood and can have their ends and lower part of their sides rounded (as shown in Figs. 2 and 14,) to cause less resistance and more easily mount slight obstructions on the ground when the machine is in operation, or when it is being removed. The bottoms of said transverse runners can be shod with metal plates 232, as shown in Figs. 61, 57, 53 and 54, of two of the modifications of my machine. Said transverse runners can be provided with hooks 233, or eyes 234, (Fig. 25) for conveniently connecting horses with the machine for removing it.

In most cases, the use of transverse runners to support the machine upon is preferable, yet in some cases I may employ different supporting timbers (not shown) which timbers may be used separate from each other or framed together in any simple and suitable manner.

I could mount my machine upon wheels or rollers (not shown) and in some instances I may use no supports except letting the machine rest upon its bed-plate, which bed-plate could if desired be made smooth and without ribs or projections on its under side and also have its lower corners rounded off, in order to move more easily over the ground.

The side pieces 2 and 3, of the main-frame have circular openings through them, which are best shown in the sectional view Fig. 3, which circular openings are to receive the shaft 9, and to also serve as bearings therefor. Upon said shaft 9, are mounted two winding drums 10 and 11, which by means of the feathers or keys 12 and 13, are secured to said shaft 9, to rotate therewith, the said feathers or keys 12 and 13, being in this instance fitted into longitudinal slots in said shaft 9, and into corresponding slots in the hubs of the winding drums 10 and 11. Said winding drums could be secured to their shaft 9, by any other simple and appropriate means.

In Fig. 3, the winding drums 10 and 11 are each shown as divided longitudinally into halves, one half of each being removed. These halves are each provided with flanges and bolt holes at their ends for bolting them together as shown in Fig. 2. The object in having the winding drums 10 and 11, each separable into two parts, is to provide for lighter handling when transporting and also to avoid loss of an entire winding drum by breakage of only a part thereof. The winding drums are preferably made hollow to render them lighter, but when thus made, they should have longitudinal stiffening and strengthening ribs 14, (Figs. 3 and 15,) which ribs could in a spoke-like manner extend to and connect with the pipes 15, through which the shaft 9, passes, the said pipes 15, being an extension of the hubs of each of the winding drums. The said spoke-like ribs can be made in any other simple form adapted to the purpose.

The various winding drums herein referred to can each be made in halves, or each winding drum could be made in a single piece.

The winding drums 10 and 11 are shown as having spiral grooves to receive the draft rope, but in some cases I may use a winding drum or winding drums having a smooth face or winding surface as shown in Fig. 62. The draft rope can be connected with its winding drum in any simple and suitable manner, but it is desirable to have the eye in the end of the draft rope, as well as the thickened part of its splice, both located below the face level of the winding drum, and therefore I preferably provide at one end of the winding drum, a recess 16, (Figs. 15 and 16, also shown in Fig. 54,) which recess, is made to receive the eye or thimble of the draft rope 18 (Fig. 15), which draft rope 18, is securely held in its recess 16, by means of the cross pin 20, or any other simple device adapted to the purpose. The bottom part 21, of the recess 16, (Fig. 15,) is preferably made to gradually curve outwardly to the winding surface of the winding drum in order to provide a good bearing for the draft rope 18, and avoid short and injurious bending thereof. To remove the cross pin 20, an opening 22, can be made in the end of the winding drum to admit the hand of the operator.

To hold the two members 18, and 19, of the draft rope in place on the winding drums when the draft rope is slackened, I sometimes provide draft rope holding bars 23 and 24, (Fig. 3,) which can be journaled in the frame of the machine so as to roll if desired. These rope holding bars are each located parallel to and near the face of its respective winding drum, just enough space being left between the said rope holding bars and their winding drums to permit the draft rope to pass through, when winding. Additional rope holding bars could be placed in a like manner at several different points around the winding drums if desired.

In some cases instead of securing the rope holding bar permanently in the main frame of the machine at a fixed point, I may mount a rope holding bar 235 in two arms 236, as shown in Fig. 62 which arms are pivoted from the drum shaft or some center, as that of the winding drum, so that in its swinging, the rope holding bar will always be at the same, and a proper distance from the face of the winding drum to hold the draft rope thereon. Instead of the rope holding bars I could use rope holding parts 25 and 26, partially surrounding the face of the winding drum and located a proper distance therefrom. In some cases I use with the spirally grooved winding drum, a groove traveler 27, Figs. 17, 18 and 54, which groove traveler consists of a wheel mounted on a suitably located bearing, or on a rope holding bar 24, or 287, and caused to rotate thereon by contact with the spiral groove of the winding drum when said drum rotates. The groove traveler 27, keeps the draft rope in its proper groove on the drum. Said groove traveler is not claimed in this application because it is fully described and claimed in my application for Letters Patent for improvements in stump extractors, filed October 5, 1892, Serial No. 447,969.

To cause the draft rope to wind, each coil close together upon the drum when a smooth-faced or non-grooved winding drum is used, I provide preferably a screw shaft mounted in suitable bearings of the main frame and on this screw a draft rope confining device 30 (Figs. 21 and 62) which draft rope confining device has a screw-thread cut through its screw-shaft opening to fit the screw 237, that propels it. The lower part of said draft rope confining device could project, as shown, into a longitudinal slot in the bed-plate to prevent the draft rope confining device from revolving with the screw 237, which screw is rotated by means of the teeth of the small wheel 238, (Fig. 62) meshing with the teeth of the larger wheel 239, which wheel is mounted upon the shaft of the winding drum. A small anti-friction wheel 240, could be placed on the screw shaft to turn loosely thereon and independently of the rotations of the said screw shaft. The pitch or lead of the screw shaft must be such as to keep the said rope confining device just ahead of the draft rope coils as they are wound on the drum, the anti-friction wheel 240, being in rolling contact with the draft rope to reduce the friction and wear of the rope.

To the bed-plate 1, is cast thereon or strongly bolted thereunto, a bearing bracket 230, (best shown in Fig. 27,) which bracket serves as a bearing for the shaft 9. Mounted loosely upon said shaft 9 and adapted to rotate independently thereof (when desired) is a worm wheel 31, the hub of which worm wheel is preferably provided with recesses and projections to fit the projections 32 and the recesses 33 of the clutch coupling 35, the said recesses 33, and projections 32, being best shown in Fig. 1. The clutch coupling 35 is keyed or feathered to the shaft 9, so as to revolve therewith, but has sufficient lateral play on the shaft 9, to permit it to engage with or disengage from the worm wheel 31, and can be so operated, by moving the lever 34, its disengaging movement being shown in dotted lines in Fig. 2, and when said clutch coupling is thrown out of engagement with the worm wheel 31, horses can then draw out the draft rope, unwinding it from the winding drums much more speedily than it can be done by a reversal of the engines and of the worms and worm wheels of the machine.

Instead of using a clutch coupling 35 I could use one or more keys placed by hand of the operator into longitudinal slots provided in the shaft 9, and slots to match them in the hub of the worm wheel 31, similar to the manner in which the worm wheel 78 is keyed to its shaft as shown in Fig. 25, but the clutch coupling method is more convenient and preferable than to use the said keys.

Keyed to the shaft 9, to rotate therewith is a chain wheel 37, (Fig. 14,) having a chain belt 38 which drives a smaller chain wheel 39, which is mounted upon the end of a right and left hand threaded screw 40, as shown. This screw 40, is preferably mounted in a pivoted frame having two side pieces 41 and 42, Figs. 3, 25 and 4, which side pieces can swing from the shaft 9, or as shown in this instance, they are pivoted to swing from the hubs 43 and 44, of the side pieces of the main frame. The rear part 45 and 46, of said side pieces 41 and 42 can, if desired, be made heavy or be weighted to act as a counterbalance weight, and circular pieces 73 and 74, (Fig. 26,) or any other simple and suitable means can be employed for holding the said side pieces 41 and 42 on their hubs 43 and 44. These side pieces 41 and 42, can be made in any other simple outline, shape or form that would afford the necessary strength and be adapted to accommodate the parts connected therewith. Bolted to the side pieces of the main frame are two confining pieces 47 and 48, which hold the outer part of the side pieces 41 and 42, securely up to the side pieces of the main frame, and prevent the side pieces 41 and 42 from swinging, either too high, or too low, it being unnecessary for them to swing through but a small part or arc of the circle. These confining pieces 47 and 48 could be cast on the side pieces of the main frame, and in some cases I cast on said confining pieces 47 and 48 curved racks 51 and 52, which are best shown in Figs. 2 and 14. Keyed to the ends of the slide bar 53, are two small wheels 49 and 50, having teeth to fit the said racks and meshing therewith for the purpose of causing both said pieces of the pivoted frame to act together and with less liability of racking it.

The transverse slide bar 53 passes through circular openings 54, (Fig. 15,) of two sliding draft rope guides 55 and 56, (best shown in Fig. 25) which sliding draft rope guides preferably have a circular opening 57, (Fig. 15,) which is provided with a screw-thread to match its respective part of the thread of the right and left hand screw shaft 40, which screw shaft passes through said openings 57.

The purpose of the slide bar 53, is mainly to prevent the sliding draft rope guide or its frame from rotating with the screw shaft, and it also serves as a sliding bearing for the rope-guide and as a tie-piece for holding together the two side pieces 41 and 42, of the pivoted frame. The sliding draft rope guides have suitable frames, in the lower part of which frames, in this instance, are located on vertical pins or shafts, draft rope guide rollers, or pulleys 58, 59, 60 and 61, (Fig. 2,) which pulleys rotate horizontally as the draft rope passes between and in contact with them. In connection with the guide pulleys 58, 59, 60 and 61, I preferably use auxiliary guide rollers or pulleys 62 and 63 (Fig. 15) to rotate vertically. These auxiliary guide rollers 62 and 63 serve to prevent injury to the draft rope by not permitting it to come in contact with the flanges of the guide pulleys when unwinding from the drum, or when the draft rope is swinging the pivoted frame into a proper vertical angle of draft, and although these auxiliary guide rollers answer a useful purpose, they are not necessary in all cases.

In operation, as the draft rope winds upon the winding drums, the screw 40, rotates and propels the sliding draft rope guides 55 and 56 from their positions at the sides of the main frame toward its center, where they meet, when the winding drums have wound up all of the draft rope that they can contain, and by unwinding the draft rope, and consequent reversal of the winding drums and reversal of the rotations of the screw 40, the sliding draft rope guides are thereby propelled back to their former positions at the sides of the main frame and are ready for further use.

In operating my machine I usually anchor to a stump 96 as shown in Fig. 32 and when thus anchored, the machine must adjust to, or come into proper line of draft with each stump to be pulled, and in making its numerous adjustments, it is very desirable that the machine should, of itself, and without assistance from the operator, be capable of swinging into line of draft and while thus seeking its draft line, it is especially necessary that the draft rope should be guided properly upon the winding drums, for the reason that before the machine has squarely faced the stump to be pulled, the draft rope would frequently come to the winding drums on such an angle, as, without proper guiding mechanism, would cause it to wind in a foul manner, and also subject the draft rope to cutting or other serious injury by its drawing across the points of the partitions that are between the grooves of the winding drums; and it will therefore be readily seen that the guide pulleys 58, 59, 60 and 61 are an important feature in my machine, as, in operation, they not only guide the draft rope properly upon the winding drums at all times and without adjustment of the draft rope on the winding drums by the operator, but they also serve as good and non-injurious bearing surfaces for the draft rope to be in contact with, when it is swinging the machine into its proper draft line, which movement is also effected without assistance from the operator.

The object in having the sliding draft rope guide mounted between the side pieces 41 and 42 of the pivoted frame is to provide for the necessary vertical adjustment of the guide pulleys when the draft rope is connected with a stump located either upon a higher or a lower horizontal plane than that upon which the machine sets. Said vertical adjustment requires the said side pieces 41 and 42 to swing through but a small part or arc of the circle.

As a substitute for the sliding rope guides with their guide pulleys 58, 59, 60 and 61, I sometimes use a sliding rope guide similar to the one shown in Figs. 9, 10 and 11, which rope guide is provided with vertical guide rollers 68 and 69 (Fig. 9) adapted to rotate horizontally and in some cases at the bottom of the guide frame I use a vertically rotating auxiliary guide roller 70, in connection with the guide rollers 68 and 69 and could if desired use another vertically rotating auxiliary guide roller (not shown) located in a like manner across the top part of the rope guide frame, and in some instances I provide a small auxiliary guide pulley 71, at the rear part of the rope guide frame, as shown.

If the draft rope space 72 between the guide rollers 68 and 69 be made of sufficient length to provide for the necessary vertical adjustment hereinbefore mentioned of the draft rope, in some cases the pivoted frame need not be used, and the screw shaft 40 and the slide bar 53, could be adapted to have their ends pass into the side pieces of the main frame instead of into the side pieces 41 and 42, as shown. Instead of the guide rollers 68 and 69 I could use non-rotating cylinders, or non-rotating standards of any suitable form, but the use of cylinders to roll, or of the guide rollers, is preferable. As another substitute for guide pulleys and guide rollers, I could use a modified sliding draft rope guide Fig. 50 having a circular opening 68ª through it to receive the draft rope, which circular opening should be flared at the front and rear as shown, and could be made of hard wood, or soft metal, such as brass, or if made of hard metal it could be lined with a suitable softer metal if desired, to reduce the wear of the draft rope. When the sliding draft rope guide, Figs. 50 and 51, is employed, the use of the pivoted frame would provide for its vertical adjustment, when required.

Mounted in the rope guide frame of my machine, or in the rope guide frames of any of its modifications herein mentioned, I contemplate the use of guide pulleys, guide rollers, guide blocks (Fig. 50,) and non-rotating cylinders, or standards, whenever it may be either necessary or desirable for the purpose of guiding the draft rope upon its winding drum. The driving gears that rotate the screw shaft 40, should be made of such diameters as will cause the screw to gradually propel each of the draft rope guides a distance equal to about one diameter of the draft rope at each revolution of the winding drums.

I could use other simple means (not shown) for propelling the sliding draft rope guides, as for instance: to connect the rope guide with a belt adapted in any suitable manner to move forward and back at the front of the machine, or a rack and pinion could be used to propel the rope guide, or a winding device having its rope connected with the rope guide to pull it, or a chain wheel could be used with its pull chain attached to the rope guide, but these last described methods would all be less desirable than the other methods described, and as shown in the illustrations.

Located at the rear of the worm wheel 31, (Fig. 26) and adapted to engage or mesh with the teeth thereof, is a worm 75, the lower end of its shaft 76 having a suitable bearing 77, in the bed-plate 1, and the upper part of said shaft 76, provided with a bearing in the top plate 4 and projecting through the top plate far enough to receive the worm wheel 78, which worm wheel is keyed on said shaft by means of a key 36, (Fig. 25,) fitted into a slot cut in the hub of the worm wheel and a corresponding slot cut longitudinally in the shaft 76. The teeth of this worm wheel 78, mesh or engage with its vertically rotating driving worm 79 which driving worm 79 is rotated by the engines 80 and 81 as shown, and the machine is thus operated. The boiler 82 can be mounted upon longitudinal runners 83 and 84 and in this instance the boiler is set on the runners 7 and 8 of the machine, and can be secured thereto in any suitable manner for conveniently disconnecting it therefrom for removal purposes. A flexible tube or hose 85 is preferably used, and may be employed in connection with metal pipes 87 and 86 for conveying steam from the boiler to the operating engines 80 and 81. The said hose or tube 85, can be made of rubber or other suitable and well known material.

The object in using a flexible tube or hose 85, is to lessen the liability of racking at the joints or breaking the steam pipes by any sudden shock the machine may receive when operating, and by reason of the draft rope or its connections slipping off a stump, or of the top of a decayed stump pulling off when connected with the draft rope, and said flexible tube or hose would be required when, as in some cases, I set the boiler upon the ground near the machine instead of upon the runners of the machine, and by providing a flexible tube or hose of sufficient length the machine can make its adjustments or swing into its draft line with occasional removals of the boiler toward the machine when required to avoid breaking the tube or hose, or the boiler can be so connected with the machine as to move with it.

I could use one large engine for operating my machine but I deem two smaller engines preferable in this case.

As another means for operating my machine, as well as the several modifications, I may use one or more horses or other common draft animals, and in such case I could provide a draft lever, or levers, connected in any simple and suitable manner with the winding drum, in some cases, where a horizontally rotating winding drum is used, or with a vertically located driving shaft of either a horizontally or vertically rotating winding drum, it being desirable to have the draft lever or levers so connected with the machine, as to enable the draft animals to walk in a circle around the machine when operating the draft lever or levers.

In some cases I use a draft lever socket 166, (Figs. 46, 47 and 48,) which has recesses 171, 172, 173 and 174, to receive the four draft levers 167, 168, 169 and 170 and said lever socket 166, has a circular opening 175, to receive the driving shaft 76 of the worm 75, from which shaft 76, the worm wheel 78 has been removed. This lever socket is not keyed to the shaft 76, but is provided with a ratchet wheel 176 which ratchet wheel is secured to the shaft 76 by means of keys 177 and 178, and with the teeth of this ratchet wheel engages a pawl 179, which pawl can turn slightly, on a vertical pin 180, passing through the circular openings therefor in the lever socket and in the pawl, as shown. The said pawl 179, has a pointed bolt 181 provided with a coil spring 182, for pressing the bolt 181, against the rear part of the pawl 179, and for holding it in engagement with the ratchet wheel 176, and as shown, this pawl can be made to rotate the ratchet wheel horizontally, either to the right, or left, as may be desired, and the said pawl preferably has two arms. 183 and 184, to which are connected the operating ropes 185 and 186, which operating ropes are extended to a point near the small end of the draft lever 167, to be within convenient reach of the driver for throwing the pawl into or out of engagement with the ratchet wheel when desired. To the small end of the draft levers, a suitable lever clevis 187 is bolted, and the eye 189 of the clevis, is a ring 192 having a grip hook 190 and a letting over chain 188, with a link or ring 191, at its end. The shaft 76 need not, in all cases, extend above the top of the ratchet wheel 176, and when it does not, the circular opening 175, of the lever socket could be dispensed with.

At times when operating the machine the draft rope may, by reason of a high hitch, or of uneven ground, be too high for the horses to conveniently cross when making a heavy pull, and at such a time, by the use of said draft rope lever, the pawl 179, can be thrown out of engagement with the ratchet wheel 176, and as the worm and worm wheel driving gears would prevent retrograde motion of the machine and thus hold the load, the horses could then walk over the high draft rope without operating the machine, or if too high, the horses could be disconnected and taken around at the rear part of the machine and connected with the draft lever after it has been set at a more convenient point and across the draft rope, and by throwing the pawl back into engagement with the ratchet wheel 176, the machine can again be operated.

In some cases, instead of disengaging the pawl as last described, I disconnect the horses from the eye 189 of the lever clevis 187 and let them step over the high draft rope or lead them around the rear part of the machine and connect them with the ring 191, of the letting over chain 188, until the draft lever is pulled over the high draft rope and then they can be again connected with the eye 189, of the lever clevis 187. The letting over chain 188, should be of sufficient length to answer the purpose, and if at times it is desirable to take a shorter hitch than the whole length of the chain, it can be shortened by inserting one of the links of the chain in the grip hook 190, so the shortened chain would pull directly from the grip hook 190, instead of pulling from the link 192, as shown.

The anchor ropes 88 and 89 can be connected with the machine in any simple and suitably strong manner. In the forms shown in Figs. 25 and 49, I provide anchor holders 90 and 91 having recesses 93 and 94 to receive the eyes or end-loops (not shown) of the anchor ropes 88 and 89 which are securely held in said recesses by means of the cross pins 94 and 95, which cross pins pass through said anchor rope eyes or loops and also pass through the sides of the anchor holders and side pieces of the main frame. The outer ends of the anchor rope can be connected with an anchor ring on the end of an anchor chain 97 (Fig. 32) which anchor chain is shown around an anchor stump 96 which stump serves as an anchorage for the machine while pulling other stumps, as shown.

When a single stump cannot be found sufficiently strong to be suitable for an anchor, I sometimes use my improved anchoring device shown in Fig. 33, which consists of a rope 121, connected with two anchor stumps 122 and 123, by means of chains 125 and 126 or by other simple and appropriate means, and said rope 121, having a pulley block 124, as shown, for draft equalizing purposes, and having the anchor ropes 88 and 89 of the machine connected with said pulley block, and when thus arranged, it will be readily seen that the two stumps would afford a strong anchor for the machine.

The aforesaid improved anchoring device for obtaining the combined strength of two separate anchor stumps, may also be used in connection with the several modifications of machine herein mentioned, whenever it may be necessary or desirable.

The draft rope of my machine, is, in this instance necessarily used in bifurcated form in order that its two members 18 and 19 may so divide the strain upon the machine as to cause it to squarely face the stump it may be pulling, and to not permit the machine to get askew or in an oblique position when under heavy strain.

The proper position of the machine when pulling a stump, is for its front part to be at right angles with the draft line, which would be a line drawn from the hitching point at the anchor stump 96 to the hitching point at the stump that is being pulled. The draft rope of my machine (Fig. 32) is preferably provided with a pulley block 98 having a draft clevis 110, as a means of connecting therewith such extension ropes as may be necessary to reach the desired distance beyond the length of the bifurcated part of the draft rope. This pulley block 98 is used for the purpose of equalizing the draft on both of the members 18 and 19 of the draft rope as well as to afford a means of connecting the bifurcated portion of the draft rope with its extension ropes. The said pulley block 98, could, if desired, be provided with a shell covering 99 to keep the draft rope in its proper place in the groove of the pulley, or the pulley could be placed in a shell that would entirely close it, except leaving the necessary openings at each side to accommodate the draft rope, and in some cases I may use a pulley block without any such coverings as described.

It is sometimes desirable to have the draft rope conveniently separable into two pieces as shown in Fig. 37, in which case I would provide a connecting clevis 100, for connecting its ends. Instead of the pulley block 98, I may in some cases use a draft ring 102, having one member of the draft rope permanently connected with said draft ring 102, and the other end removably connected with said draft ring 102, by means of a connecting clevis 101. As a draft equalizing substitute for the pulley block 98 I may, at times, use a draft bar 103, (Fig. 35) permanently connected with one member of the draft rope, and removably connected with the other member, by means of a connecting clevis 238 and said equalizing bar 103, could be provided with a draft clevis 109. Instead of the pulley block 98, and the other devices herein described, I could use a block 105 (Fig. 34) having a groove to receive the draft rope as shown, and provided with a draft clevis 108 and the said block could have a separate piece of rope 104, if desired, which could be removably connected with the two members of the draft rope by means of connecting clevises 106 and 107 and in some cases I may use a draft equalizing pulley block with the rope 104, instead of using the block 105.

I sometimes connect with the draft rope of my machine, an extension rope 111, passing around the pulley 112, of my improved quick speed pulley block and connected with an auxiliary anchor stump 113, which sustains one half of the strain required to pull the stump 114. This said improved pulley block has a draft clevis 376 with a pin 377 to serve as a shaft for the pulley or sheave 112, and as a convenient means for connecting the draft clevis 376 with the quick speed rope 116. I preferably leave one end of the draft clevis open to receive the link of said quick speed rope 116, and use the cross pin 115 for securely making the connection. Instead of having the end of the draft clevis 376 open, as shown, it could be permanently closed, if desired, and other simple connecting means could be used as a substitute for the cross pin 115.

The improved pulley block, like any other ordinary pulley block serves to increase the power of the machine, but its use is not required except when extraordinarily strong stumps are to be pulled, and then, the increased power is only needed long enough to weaken or start the stump, and as it is desirable to increase the speed of the pulling operation as soon as the slower and stronger power is no longer required, I connect the rope 116, with the connecting clevis 118, Figs. 32 and 52$^B$, and the strain of the pull is soon transferred from the rope 111, to the rope 116, and the rope 111, is then no longer needed and can be removed. The rope 116 can be connected with the connecting clevis 118 at the beginning of the operation, provided there be enough slack in the said rope to let the pulley block power first start the stump, before the transfer to the quicker speed and lighter power method is effected.

In operation, after pulling the stump 114, the machine would swing around into line of draft with, and pull the stumps 119 and 120, and after winding up all of the bifurcated portion of the draft rope the winding drums can be disconnected from the driving gears by throwing the clutch 35, and the draft rope can then be speedily unwound and again extended to be ready for further use.

The connecting clevis, Figs. 38 and 39, has a U shaped body 131 with two eyes to receive the cross pin 132 as shown, and is such a connecting clevis as is most generally shown in the illustrations, but each numbered differently for convenience in locating the particular connecting clevis referred to in this specification. In some cases I use a connecting clevis 133 Figs. 40 and 41, which has a cross pin 137, and if desired, can have a small chain 136, connected with the cross pin and the clevis, to prevent loss of the pin and has a bar 134 secured in the body of the clevis in circular openings provided therefor as shown, or in any other simple and suitable manner, and said bar can, in some cases, have a piece of gas pipe 135 to form shoulders for holding the sides apart and thereby strengthening the clevis. The bar 134 when riveted at its lower end, as shown, prevents the clevis sides from spreading apart and renders breakage at the bend of the body of the clevis less likely to occur, and said bar 134 also serves to keep the clevis in the ring 127 to prevent loss as well as to always be at hand for use in connecting its rope with another rope, or with a chain when necessary.

I sometimes use a grip clevis 138, Figs. 8, 13 and 52$^A$, for connecting a rope or chain with, any desired link, in the body of another chain 139, said grip clevis 138, being preferably made of square bar metal as shown, and having a cross pin 140. In use the said grip clevis is placed astride of the link, as shown, and when thus placed, holds securely and cannot slip when the strain is applied.

For a means of connecting ropes, and to provide for conveniently and speedily disconnecting, when the ropes are, under strain, I use my improved fly hook 144, Figs. 12 and 52$^A$, as shown, which fly hook is composed of a bar 141, provided with an eye 142 at one end, and its other end passed through the eye 143 of the hook or lever 144, and turned back and welded to the body of the bar 141, and the said lever 144, has a projection or stop 145, to prevent the lever 144, when released, from flying back too far, so as to strike the rope 146, and thus bruise or injure it. The said lever can also have a jog or stop 147, to prevent the confining link 148 from slipping too far back on the lever 144. Said confining link 148, is welded into an opening in the bar 141, as shown, and can have a projection 149 to serve as a striking point for the tool of the operator which projection 149, should be located far enough forward, so that the tool of the operator cannot be caught or struck by the small end of the lever 144, when the confining link is being knocked off and the lever released, as shown in the dotted lines.

When a rope, of small diameter, is used, and it is desirable to connect another rope or chain therewith at any point within the length of the said rope, I sometimes use a rope coupling device (Figs. 22, 23 and 24), which is composed of a disk 378 having a peripheral groove 379, to receive the rope 241 and said groove being widened out sufficiently in one place as shown at 242 to accommodate the part 243, of the rope where it passes out of the mouth or top of the groove, from beneath the outer coil 244. The disk 378 is provided with two jaws 245, with a circular opening through each jaw to receive the cross pin 246 which cross pin is used for connecting a chain 247, as shown, with the coupling device, and said chain can if desired, be provided with a hook or a ring (not shown) at its other end for the purpose of making a slipnoose hitch around a stump. In some cases, to increase the friction and lessen the wear of the rope I line the bottom of the groove 379 with hard wood 248, or I may in some instances, line it with hard rubber or with brass, or other suitable soft metal. When wood is used for a lining for the groove, it should be composed of blocks set endwise of the grain of the wood, or with the end of its grain out. The disk 378 may be made either with or without the central opening 249. In using the said rope coupling device, the rope 241, is properly placed in the groove as shown, and when the strain is applied there will be enough friction on the rope to prevent slipping, and securely hold it.

When a rope is connected with a stump and not quite long enough to reach to the draft rope or its extension piece of rope, I sometimes use the take-up-chain 251, (Fig. 42,) which has long links, and one or more of these links can be thrown out, as shown, if not required to make the reach.

Wire rope being lighter, is in some cases preferable to chain for making a slipnoose hitch around a stump for the purpose of pulling the stump, but when a hard metal ring or hook is used at the end of the rope for making the slipnoose, the rope is subject to serious injury by reason of its chafing in said ring or hook, and if the body of the ring or hook be of small diameter, the rope is liable to injury by short bending when in bending contact with the body of small diameter of the ring, or hook, and to remedy this difficulty I use a hitch rope ring, as shown in Figs. 5, 6 and 7. This hitch rope ring, is preferably made hollow and in halves 150 and 151, which halves can be riveted or bolted together. The body of said ring can be made of large diameter with a central opening for the rope 152 to pass through in making the slipnoose as shown. The said rope can be connected either permanently or removably with the ring in any simple and suitable manner, or it can be spliced around the part 153, as shown, and pass out through the opening shown in the side of the ring. The said hitch rope ring, can be made of brass or other suitable soft metal to render the rope less liable to injury, or it could be made of some harder metal and lined with hard wood 154, as shown, or it could be lined with brass or other soft metal suited to the purpose. If lined with wood, the blocks should be set in said hitch rope ring endwise of the grain, or with the end of the grain of the wood outside. The free end of said rope 152 can be provided with a link 155, or any other simple and appropriate device for use in connecting with the draft rope. In some cases I may make a hitch rope ring 252 (Figs. 28 and 29) of hard, strong wood with a metal band or collar 253 around it, and said collar can have jaws 254 to receive the eye of the rope 255, and a bolt 256 for tightening the collar, and also serve to securely hold the rope 255, by passing through its eye, as shown. As a substitute for the said hitch rope rings I may in some instances use a hollow hook 257 (Figs. 30 and 31) preferably provided with an eye for holding the eye of the rope 260. The said hitch rope hook 257, is made hollow to lighten it and can be made of brass or other suitable soft metal. I sometimes use a hitch rope 156, (Fig. 32) provided with a hook (not shown) or a ring 157, at one end and its other end connected, by means of a connecting clevis 261, with a short chafing chain 158, (Figs. 32 and 52ᴬ,) which chafing chain passes through the ring 157, and sustains the chafing in the ring that would be too injurious for a rope. The chafing chain 158, could be permanently connected with the hitch rope 156, if so desired. A single chain of sufficient length and strength for use in hitching to large stumps, would be too heavy to handle, and to remedy this difficulty, I, in some cases, use a hitch chain composed of several separate pieces or sections of chain 159, 160 and 161, (Figs. 32 52ᴬ,) which are, one at a time, placed around a stump 119, and connected with connecting clevises 262 and 263, and one of said chains 159, being provided with a hook (not shown), or a link or ring 162, for making the slip noose hitch around the stump, as shown. For hitching to a back root 165 of a stump 114, I usually employ a root hitch chain 163, with a link or ring 164 either permanently or removably connected with one end of said root hitch chain 163, and its other end passed under a root 165, and then connected with the ring 164 by means of a connecting clevis 264, as shown, or said end of the chain could be connected with the ring by means of a hook (not shown) or by means of any other simple and suitable connecting device.

As a modification of my double winding drum machine hereinbefore described, I mount a single winding drum 200, (Fig. 49) on a shaft 199 which shaft is journaled into a suitable frame, and said shaft is provided with a wheel 198 having teeth that mesh with the teeth of a smaller wheel 197, for rotating the screw 196, which screw is provided with a draft rope holder 195, which has a recess for receiving the eye of the end of the draft rope member 194, which is secured to the draft rope holder 195, by means of a cross pin passed downwardly through circular openings in the top and bottom parts of the said recess and also passing through the eye of said draft rope member 194, and the other member 193, of the draft rope is suitably connected with the winding drum to wind thereon. The draft rope is provided with a pulley block 201, both for draft equalizing and power increasing purposes. The ropes 265 and 266, are for anchoring the machine in a similar manner to that in which the aforesaid double drum machine is anchored. The draft rope holder 195 has screw threads in its circular opening, to fit the threads of the screw 196, which screw passes through it. The winding drum can be either of the spirally grooved, or of the smoothed faced, non-grooved kind, and should be provided with a sliding draft rope guide, having either guide pulleys or guide rollers, such devices as are hereinbefore fully described, for guiding the draft rope on the winding drum. The draft rope member 194 could be connected with the said draft rope holder in any other simple and suitable manner than as above described, and instead of the draft rope holder 195, being mounted upon the screw 196, it could be mounted to pull directly from a bar, which is not shown, but in a manner similar to the arrangement of the anchor rope carrier 212, the anchor bar 217 and the operating screw 213, for carrying the anchor rope of the modification of my machine, as shown in Figs. 52, 54, 55 and 56. In operation, the draft rope winds on the winding drum, advancing toward the center of the machine and at the same time the draft rope holder 195, with the draft rope member 194, also moves toward the center of the machine, and by such co-operation, the machine in use will swing properly from its anchorage into draft line with the stump to which its draft rope may be connected, and will also squarely face its work.

Figs. 52 and 52$^A$ show a very important modification of my machine, in which but a single winding drum is used, and in connection with which, it is rendered possible to use a single draft rope, and regardless of what part of the winding surface of the winding drum that the draft rope may be winding upon, the machine in operation, will swing into, and stand at right angles with, the draft line, extending from its anchorage to the stump it may be pulling, and will thus squarely face its work and not get into a cornerwise or other foul and improper position while it is making a pull. The main frame of this machine, is in this instance, shown as composed of a bed plate 267, two side pieces 214 and 215 and a top plate 268, all strongly bolted together and mounted upon transverse runners 269. Journaled into the side pieces 214 and 215, of the main frame is a shaft 210, on which is mounted, to rotate therewith, a winding drum 209, which can be secured to the shaft 210, by means of keys, as is hereinbefore shown and described in the case of my double drum machine, or said winding drum can be secured to the shaft in any other simple and suitable manner. Mounted upon said shaft 210, is a wheel 65, having teeth that mesh with the teeth of the smaller wheel 64, for rotating the screw 205, and such wheels could be used with my double drum machine for rotating its screw 40, instead of using the chain wheels and chain belt as is shown and described. The screw shaft 205, is in this instance, mounted in side pieces 202 and 203, which, as in the case of my double drum machine, form a pivoted frame to swing from shaft hubs provided on the side pieces of the main frame and are held up to said side pieces and said swinging movement is properly limited, by the two confining pieces 270, which are bolted to the main frame. The said side pieces 202 and 203 have a slide bar 204, passing through a circular opening 271 in the sliding draft rope guide 206, which draft rope guide has a circular opening 272 with a screw thread extending through it to match the thread of the screw 205 which screw passes through said circular opening 272. In this draft rope guide 206, are mounted two horizontally rotating guide pulleys 207 and 208, and if desired, auxiliary guide pulleys or rollers 273 and 274 and auxiliary guide rollers 275 and 276, can be placed in the rope guide frame to rotate vertically, and located as shown in Fig. 54. The draft rope 211, passes between said guide pulleys 207 and 208 and also between said vertically rotating auxiliary guide pulleys 273 and 274, and auxiliary guide rollers 275 and 276, and said draft rope is preferably connected with the winding drum 209 in a like manner as that shown in the case of my double drum machine. The teeth of the large wheel 65, also mesh with the teeth of another small wheel 216, which wheel is keyed to, and rotates the screw 213, which screw turns in bearings or circular openings provided in the side pieces 214 and 215 at the rear part of the main frame, and this screw passes through a nut 227, which has a screw thread to match the screw 213. This nut 227, is placed in the curved slot 226 of the sliding anchor rope carrier 212 and is held therein by means of flanges (not shown) projecting from its top and bottom, outside of the said slot, which flanges will permit the nut to move in its slot 226, as required. The said nut 227 could be suitably secured in said slot in any other simple manner than by the use of the said flanges. The sliding anchor rope carrier 212 is mounted upon a bar 217, which bar, as shown, has gudgeons 218 and 219, at its end to fit into circular openings in the side pieces 214 and 215 of the main frame, and said bar is adapted to rock slightly in its said openings in the side pieces.

The sliding anchor rope carrier 212 is preferably provided with anti-friction rollers 220 to roll on the rear part of the bar 217 as shown, and can also have vertical circular openings to receive the cross pins 221 and 222 which pass through the eyes at the ends of the two anchor rope members 224 and 225 to securely connect them with the sliding anchor rope carrier 212. The said anchor rope 224 and 225 is preferably provided with a pulley block 228, for equalizing the draft on both members of the anchor rope, and to its draft clevis 277, can be connected a chain (not shown) for making the hitch to a suitable anchor, or anchor stump. The anchor rope could be made single instead of double as shown, but is preferably made double to apply the strain equally at points near the two corners of the sliding anchor rope carrier, and thereby render it less liable to cramp on the bar 217, than if connected at but one point.

The bar 217, could be rigidly mounted in the main frame, but by having the rocking feature, it is less liable to become broken by reason of the anchor point being at times on a higher or lower horizontal plane than that on which the machine sets.

If with this machine, greater power should be desired, it could be handily obtained by arranging the anchor rope as shown in Fig. 52ᴮ, having one member of the anchor rope connected at 229, with the sliding anchor rope carrier 212, and the other member of the anchor rope strongly connected in any simple and suitable manner with the main frame at 250, and when the anchor rope is thus arranged the draft rope 211, should be passed through a pulley block 28ᵃ and then doubled back to the machine and its end strongly connected in any simple and appropriate manner to the frame of the machine at 231, as is shown. Upon the shaft 210, is mounted a worm wheel 278 the teeth of which mesh with a worm 279, and on the worm shaft 280, two cranks 281, can be provided for connecting operating engines therewith, and in this instance the operating engines are planned to be of the upright or vertical kind, and a part of the frame 282 and 283, of each of said engines is shown in Fig. 53 in broken section. In some cases I may key on the worm shaft two auxiliary drums or spools 284, for use in moving the machine short distances, by connecting an auxiliary draft rope (not shown) to a stump, stake or post and connecting the other end of said auxiliary draft rope to one of said auxiliary drums or spools, and by winding it thereon the machine would move toward said stump, stake or post. One of the auxiliary drums or spools 284, could have an auxiliary draft rope attached to it and the said auxiliary draft rope thence lead (through suitable guides, if necessary), out and around a pulley connected to a stump or anchor among the stumps to be pulled, and thence back to the machine and connected to the end of the main draft rope, so as to extend said main draft rope out among the stumps for further use, by rotating the auxiliary drum or spool and winding thereon the small auxiliary draft rope. This method would dispense with the use of horses for re-extending or drawing out the main draft rope after it has been wound up.

The bed-plate 267, (see Fig. 53) can have a recess 285, for the worm 279, which can run in oil placed in said recess for lubricating purposes. The worm wheel can be made in one piece, but in this instance, it is shown in two pieces, one of these pieces being a toothed ring 278ᵇ, which encircles the central or hub part 278ᵃ, as shown, and said toothed ring can be securely held in its proper place by means of bolts or rivets passing through holes as shown, one half of each hole being bored in the toothed ring 278ᵇ, and the other half of said holes, bored to match, in the central or hub part 278ᵃ, around the joint of the two parts. The toothed ring 278ᵇ, can be made of the same kind of metal as the hub part 278ᵃ, or can be made of any other suitable and well known metal. If the teeth of the ring 278ᵇ, should become worn out or broken, it would not be necessary to renew the entire worm wheel. The worm wheel 278, is adapted to rotate independently of its shaft 210, but can be caused to rotate with the shaft by the use of a clutch coupling 286, or by the use of keys as hereinbefore fully explained in the case of my double drum machine.

In some cases, I may use a rope holding roller 287, (similar to those hereinbefore described) with this machine, and may use additional rope holding rollers as shown in end view, in dotted lines at the upper part of the winding drum, in Fig. 54, and also shown longitudinally, in dotted lines in Fig. 52, and I sometimes use a groove traveler 27, Fig. 54, and said rope holding rollers and the groove traveler being hereinbefore fully described, further description of them will not be necessary. In operation, as shown in this instance, Figs. 52 and 52ᴬ the draft rope 211, winds on the winding drum from left to right, and when the draft rope is being unwound and the rotations of the winding drum are consequently reversed, the sliding draft rope guide 206 with the draft rope, and the sliding anchor rope-carrier 212 with the anchor rope, are with like speed propelled from the right hand side of the main frame to the left side, and in this unwinding operation, the machine moves but little or none, according to how taut the anchor rope may be, but it will be understood, that while a pull is being made by this method, and the power is being applied, the machine itself gradually moves toward the left, from a central draft line 306, shown in dotted lines in Fig. 52, which movement of the machine is rendered necessary in order to present unused winding surface to the draft rope as it comes to the winding drum to wind thereon. The said central draft line, if fully shown, would extend from the hitching point of the stumps to which the machine may be anchored, straight to the hitching point of the stump with which the draft rope may be connected.

Fig. 57, is another modification of my machine showing the application of a sliding draft rope guide to a winding drum mounted vertically to rotate horizontally. In this instance the frame consists of a bed plate 313, two side pieces 314 and 315, and a top plate 316, all securely bolted together and preferably mounted upon and bolted to transverse runners 317 and 318, which can if desired, be shod with metal 232, as shown; and in said main frame is mounted on a vertical shaft 319, a winding drum 320, which is keyed, or otherwise simply and suitably secured to said shaft 319 and adapted to rotate therewith, and above said winding drum on the same shaft is a worm wheel 321, which is adapted to rotate independently of said shaft when desired, and can be provided with a clutch coupling 322, of the kind hereinbefore fully described, which clutch coupling is adapted to engage with and cause the worm wheel to rotate with the shaft when necessary. In this instance, the upper hub of the worm wheel 321, extends upwardly and through the top plate and has a bearing in said top plate as shown, and to relieve the winding drum 320 of the weight of the worm wheel and cause less friction therewith when unwinding the draft rope 323, I provide a groove 324, cut entirely around the said worm wheel hub and place in said groove a collar 325, which can be made in two parts and bolted together as shown, after it has been properly placed in its groove 324. This collar is intended to sustain the entire weight of the worm wheel, and has a horizontal bearing on the top of the top plate as shown. The clutch coupling is thrown into or out of engagement by means of the lever 326, and keyed to the upper part of the shaft 319, is a wheel 327, having teeth to mesh with the teeth of the smaller wheel 328, which small wheel 328, is mounted in a yoke 329 bolted or cast on the top plate 316, and said small wheel 328, has a central circular opening provided with a screw thread to match the thread of the screw 330, which passes through said wheel-opening and also passes through a circular opening in the top of the yoke 329, and the lower end of said screw is preferably provided with an eye 331, to receive the cross pin 332, which holds the screw securely between the two jaws 333 provided on the sliding draft rope guide frame 334, in which draft rope guide frame are mounted guide pulleys 335 and 336, adapted to rotate vertically when the draft rope 323, is passing between and in contact with them as shown, and in front of said guide pulleys 335 and 336 I usually mount two horizontally rotating guide rollers 337 and 338 to provide the draft rope 323, with suitable bearing places when it is swinging the machine into its proper draft line, and to also guide the draft rope properly to the guide pulleys 335 and 336 and prevent the draft rope from being cut on the flanges of said guide pulleys. The draft rope guide frame can have two circular openings 338 and 339 to receive the two slide bars 340 and 341, which pass through the said guide frame 334, and have their ends suitably secured in the top plate 316, and bed plate 313 of the main frame. At the rear of the worm wheel 321, and adapted to mesh with the teeth thereof, is a vertically rotating worm 342, secured to a shaft 343, which has suitable bearings in the side pieces 314 and 315, as shown, and also has two cranks 344, for the operating engines to be connected with.

The draft rope is connected in any simple and suitable manner with the winding drum 320, but preferably connected in the manner shown in Figs. 15 and 54 and the other end of said draft rope is passed through a pulley block 345 and then placed between the jaws 346 and 347 and secured therein by means of the cross pin 348, which passes through openings provided therefor in said jaws 346 and 347, and also passes through the eye at the end of the draft rope. The pulley block is provided with a draft clevis 349 and may have a covering 350, as shown, and as hereinbefore described. The anchor ropes 351 and 352, are also secured between jaws 353 and 354 bolted, or cast on the top plate 316 and bed plate 313, but in this view one only of each set of said jaws is shown. The said jaws are however similar to the jaws 346 and 347 shown in Fig. 57, and cross pins 355 and 356, are in a like manner, used to secure the ends of the anchor ropes between said anchor rope jaws. The anchor ropes 351 and 352 can have a ring 357, for connecting with the chain, not shown, that may be used around the anchor stump, which is also not shown. In some cases for light pulling I may not use the pulley block 345, and use the rope singly, as shown in dotted lines in Fig. 61, instead of having it doubled back and connected with the bed plate 313 of the machine as shown.

Instead of connecting the anchor ropes 88 and 89 to the frame of my double drum machine as shown in Fig. 32, I may in some cases, as shown in Fig. 19, provide two sliding anchor rope carriers 212, 212, mounted to slide on bars 217, 217, and propelled by a right and left hand screw threaded shaft 370, rotated by a belt chain 372, driven by a toothed wheel 373, keyed on the drum shaft 9, and a toothed wheel 371, keyed on the screw shaft 370, which screw shaft turns in suitable bearings in the side pieces of the frame of the machine, and into which side pieces and the central bearing 374, the bars 217 and 217, have their bearings, or are secured.

In my double drum machine hereinbefore described, and the last described modification thereof, the two drums could be made in but one piece, having right and left hand spiral grooves cut thereon if desired, and the worm wheel 31 could be suitably located at the end of such undivided drum. If greater power be desired one of the drums 10 or 11 could be made of smaller diameter. In a machine for pulling very large stumps, both of the drums 10 and 11, made in one, would, however, be too heavy a part, for easy handling and transportation.

The rope holding bar, 23, 24, and 287, herein described and claimed, are described, but not claimed, in my other application hereinbefore mentioned.

The method of anchoring the machine, to obtain the combined strength of two anchor stumps is shown and described in this application, but not claimed herein, because, it is fully described and claimed in my aforesaid other application, filed October 5, 1892.

The fly-hook connecting device, and the rope holding bar mounted in a frame pivoted to the drum shaft, are shown and described in this application, but are not claimed, because, I am now preparing a separate application for Letters Patent thereon, which application will be duly filed before issue of the Letters Patent on this application.

Primarily, my machine and its several modifications, are intended for the pulling of stumps, yet they may also be used for pulling trees, for pulling stumps together to burn them, or to make fences thereof; for removing logs, buildings, or in fact, for removing heavy bodies of any kind, when the machine is suitably secured or anchored for doing such work.

While I have shown the preferred form of my machine, I do not wish to be limited thereto, as many modifications other than shown might be made without departing from the spirit of my invention.

Having described my invention, what I claim is—

1. In a suitably anchored stump extractor, the combination with a winding drum and mechanism for rotating it, a draft rope attached to said drum, of a sliding draft rope guide mounted in a frame pivoted to the same center as that on which the winding drum turns, a screw carried by said pivoted frame for moving the sliding draft rope guide across the face of the drum, and mechanism for operating said screw, all substantially as shown and described.

2. In a suitably anchored stump extractor, the combination with a winding drum and mechanism for rotating it, a draft rope attached to said drum, of a sliding draft rope guide mounted in a frame pivoted to the same center as that on which the winding drum turns, a screw carried by said pivoted frame for moving said sliding draft rope guide across the face of the drum, said screw operated by a gear wheel suitably mounted thereon, and said gear wheel driven by another gear wheel connected to the winding drum so as to rotate therewith, all substantially as shown and described and for the purpose set forth.

3. In a suitably anchored stump extractor, the combination with a winding drum and mechanism for rotating it, a draft rope attached to the drum, of a sliding draft rope guide with guide rollers therein, said draft rope guide mounted in a frame pivoted to the same center as that on which the winding drum turns, a screw carried by said pivoted frame for moving said sliding draft rope guide across the face of the drum, and mechanism for operating said screw, all substantially as shown and described and for the purpose set forth.

4. In a suitably anchored stump extractor, the combination with a winding drum and mechanism for rotating it, a draft rope attached to the drum, of a sliding draft rope guide with an elongated vertical opening therein to permit a vertical play of the draft rope in passing through it, said sliding draft rope guide mounted in a frame pivoted to the same center as that on which the winding drum turns, a screw carried by said pivoted frame for moving the sliding draft rope guide across the face of the drum, and mechanism for operating said screw, all substantially as shown and described and for the purpose set forth.

5. In a suitably anchored stump extractor, the combination with a winding drum and mechanism for rotating it, a draft rope attached to said drum, a sliding draft rope guide mounted in a frame pivoted to the same center as that on which the winding drum turns, a screw carried by said pivoted frame for moving said draft rope guide across the face of the drum, mechanism for operating said screw, and of a rope holding bar placed parallel to the face of the drum for holding the draft rope thereon, all substantially as shown and described and for the purpose set forth.

6. In a suitably anchored stump extractor, the combination with a main frame and winding drum mounted therein, mechanism for rotating the drum, a draft rope attached to said drum, of a sliding draft rope guide mounted in a frame with its side pieces pivoted to the same center as that on which the winding drum turns, means for holding the side pieces of said pivoted frame up to the side pieces of said main frame of the machine, a screw carried by said pivoted frame for moving said sliding draft rope guide across the face of the drum, and mechanism for operating said screw, all substantially as shown and described and for the purpose set forth.

7. In a suitably anchored stump extractor, the combination with a main frame, a winding drum mounted therein, mechanism for rotating the drum, a draft rope attached to said drum, of a sliding draft rope guide mounted in a frame with its side pieces pivoted to the same center as that on which the winding drum turns, confining pieces for holding the side pieces of said pivoted frame up to the side pieces of said main frame of the machine, a screw carried by said pivoted frame for moving said sliding draft rope guide across the face of the drum, and mechanism for operating the screw, all substantially as shown and described and for the purpose set forth.

8. In a suitably anchored stump extractor, the combination with a winding drum mounted in a main frame, mechanism for rotating the drum, of a draft rope attached to said drum, thence passing through a suitable draft rope guide and connected with a load, a frame with its side pieces pivoted to the same center as that on which the winding drum turns, confining pieces for holding the side pieces of the pivoted frame up to the sides of said main frame, rack-teeth on said confining pieces, which teeth mesh with the teeth of pinion wheels suitably mounted on the pivoted frame, and said draft rope guide mounted in the pivoted frame, to swing into draft line by the action of the draft rope, when under strain, in its lining up with the load to which it may be connected, all substantially as described and for the purpose, set forth.

9. In a suitably anchored stump extractor, the combination with a winding drum mounted in a main frame, mechanism for rotating the drum, of a draft rope attached to the drum, thence passing through a sliding draft rope guide and connected to a load, mechanism for moving said sliding draft rope guide across the face of the drum, a frame with its side pieces pivoted to the same center as that on which the winding drum turns, confining pieces for holding the side pieces of the pivoted frame up to the side pieces of said main frame, rack-teeth on said confining pieces, which teeth mesh with the teeth of pinion wheels suitably mounted on the pivoted frame, and said sliding draft rope guide mounted in said pivoted frame, to swing into line of draft, by action of the draft rope, when under strain, in its lining up with the load to which it may be connected all substantially as described and for the purpose set forth.

10. In a suitably anchored stump extractor, the combination with a winding drum mounted in a main frame, mechanism for rotating the drum, a draft rope attached to said drum and passing through a sliding draft rope guide and connected to a load, a screw for moving said draft rope guide across the face of the drum, mechanism for operating the screw, a frame with its side pieces pivoted to the same center as that on which the winding drum turns, confining pieces for holding the side pieces of the pivoted frame up to the sides of said main frame, rack-teeth on said confining pieces, which teeth mesh with the teeth of pinion wheels suitably mounted on the pivoted frame, and said sliding draft rope guide mounted in said pivoted frame, to swing into draft line, by action of the draft rope, when under strain, in its lining up with the load, to which it may be connected, all substantially as described and for the purpose set forth.

11. In a suitably anchored stump extractor, the combination with a winding drum, a draft rope attached to said drum, a sliding draft rope guide mounted in a frame pivoted to the same center as that on which the winding drum turns, a screw carried by said pivoted frame for moving said draft rope guide across the face of the drum, mechanism for operating said screw, of an engine for rotating the drum, and said engine connected with a source of power by means of a flexible conductor, all substantially as shown and described and for the purpose set forth.

12. In a stump extractor, the combination with a winding drum and mechanism for rotating the same, a draft rope attached to said drum, of a sliding anchor rope carrier mounted on a bearing parallel to said drum, at its rear part, and of mechanism adapted to move said sliding anchor rope carrier across the drum in correspondence with the advancement in the same direction of the draft rope, in its winding on the drum, or unwinding therefrom, all substantially as described and for the purpose set forth.

13. In a stump extractor, the combination with a winding drum and mechanism for rotating the same, a draft rope attached to the drum, a sliding anchor rope carrier mounted to slide on a bar placed parallel to the drum, at its rear part, mechanism adapted to move said anchor rope carrier across the rear part of the drum in correspondence with the advancement in the same direction of the draft rope, in its winding on the drum, or unwinding therefrom, and of means in connection with said sliding anchor rope carrier for allowing a vertical play, that it may adjust itself to the vertical angle of the anchor rope, all substantially as described and for the purpose set forth.

14. In a stump extractor, the combination with a winding drum and mechanism for rotating the same, a draft rope attached to said drum, of a rocking bar and a sliding anchor rope carrier mounted thereon, at the rear part of the drum, mechanism for moving said anchor rope carrier across the drum in correspondence with the advancement in the same direction of the draft rope, in its winding on the drum, or unwinding therefrom, all substantially as described and for the purpose set forth.

15. In a stump extractor, the combination with a winding drum and mechanism for rotating the same, a draft rope attached to said drum, a sliding anchor rope carrier suitably mounted to slide across the rear part of the drum, a screw for moving the sliding anchor rope carrier in correspondence with the advancement in the same direction of the draft rope, in its winding on the drum, or unwinding therefrom, and mechanism for operating said screw, all substantially as shown and described and for the purpose set forth.

16. In a stump extractor, the combination with a winding drum and mechanism for rotating the same, a draft rope attached to the drum, of rocking bar and a sliding anchor rope carrier mounted to slide thereon, a screw for moving said anchor rope carrier across the rear part of the drum, and mechanism for operating said screw, all substantially as described and for the purpose set forth.

17. In a stump extractor, the combination with a winding drum and mechanism for rotating it, a draft rope attached to said drum, a bar placed parallel to the drum, a sliding anchor rope carrier mounted thereon, a screw passing through the upper part of said anchor rope carrier for moving the anchor rope carrier across the rear part of the drum, mechanism for operating said screw, and of means whereby the anchor rope carrier may move in the arc of a circle on its screw bearing, while the anchor rope carrier is adjusting to the vertical angle of the anchor rope, all substantially as described and for the purpose set forth.

18. In a stump extractor, the combination with a winding drum and mechanism for rotating the same, a draft rope attached to said drum, of a bar with a sliding anchor rope carrier mounted thereon, of a slot in the upper part of said anchor rope carrier, a head or nut in said slot, a screw passing through said head or nut for moving the anchor rope carrier across the rear part of the drum, and mechanism for rotating said screw, all substantially as described and for the purpose set forth.

19. In a stump extractor, the combination with a winding drum and mechanism for rotating the same, a draft rope attached to said drum, a sliding anchor rope carrier mounted on a suitable bearing, mechanism adapted to move said sliding anchor rope carrier on its said bearing across the rear part of the drum in correspondence with the advancement in the same direction of the draft rope in its winding on the drum, or unwinding therefrom, and of a rope holding bar placed parallel to the face of the drum for holding the draft rope on the drum, all substantially as described and for the purpose set forth.

20. In a stump extractor, the combination with a winding drum and mechanism for rotating the same, a draft rope attached to said drum, of a sliding draft rope guide and mechanism for moving the same on a line parallel to the face of the drum, a sliding anchor rope carrier and mechanism for moving it across the rear part of the drum in correspondence with the movement in the same direction of said sliding draft rope guide, all substantially as shown and described.

21. In a stump extractor, the combination with a winding drum and mechanism for rotating it, a draft rope attached to said drum, of a sliding draft rope guide and mechanism for moving it across the face of the drum, a sliding anchor rope carrier, mechanism for moving said sliding anchor rope carrier across the rear part of the drum in correspondence with the movement in the same direction of the sliding draft rope guide, and a bar on which said anchor rope carrier slides, all substantially as shown and described.

22. In a stump extractor, the combination with a winding drum and mechanism for rotating it, a draft rope attached to said drum, of a sliding draft rope guide and mechanism for moving it across the face of the drum, a sliding anchor rope carrier mounted on a rocking bar, to slide across the rear part of the drum, and mechanism for moving said sliding anchor rope carrier in correspondence with the movement in the same direction of the sliding draft rope guide, all substantially as described and for the purpose set forth.

23. In a stump extractor, the combination with a winding drum and mechanism for rotating it, a draft rope attached to said drum, a rocking bar and a sliding anchor rope carrier mounted to slide thereon across the rear part of the drum in correspondence with advancement in the same direction of the draft rope, in its winding on the drum, or unwinding therefrom, and of a rope holding bar placed parallel to the face of the drum for holding the draft rope on the drum, all substantially as shown and described and for the purpose set forth.

24. In a stump extractor, the combination with a winding drum and mechanism for rotating it, a draft rope attached to said drum, a sliding draft rope guide and mechanism for moving it across the face of the drum, a sliding anchor rope carrier and mechanism for moving it across the rear part of the drum in correspondence with the movement in the same direction of said sliding draft rope guide, and of a rope holding bar placed parallel to the face of the drum, for holding the draft rope on said drum, all substantially as described and for the purpose set forth.

25. In a suitably anchored stump extractor, the combination with a winding drum and mechanism for rotating it, a draft rope attached to the drum and its other end connected to an eye or connection on the frame of the machine, a draft equalizing pulley on the draft rope between its said end connections to the drum and machine frame, and of a rope holding bar placed parallel to the face of the drum for holding the draft rope on the drum, all substantially as described and for the purpose set forth.

26. In a suitably anchored stump extractor, the combination with a winding drum and mechanism for rotating the same, a draft rope attached to the drum, a sliding draft rope guide, a screw for moving the same across the face of the drum, mechanism for operating said screw, of an eye or connection on the frame of the machine to which the other end of the draft rope is adapted to be attached, and a draft equalizing device on said draft rope between said frame connection and said sliding draft rope guide, all substantially as described and for the purpose set forth.

27. In a stump extractor, the combination with a winding drum and mechanism for rotating it, a draft rope attached to said drum, a frame pivoted to the same center as that on which the winding drum turns, a sliding draft rope guide suitably mounted to slide in said pivoted frame, mechanism for moving said draft rope guide across the face of the drum, of an eye or connection on the frame of the machine to which the other end of the draft rope is adapted to be attached, and a draft equalizing device on said draft rope between said frame connection and said sliding draft rope guide, all substantially as described and for the purpose set forth.

28. In a suitably anchored stump extractor, the combination with a winding drum and mechanism for rotating it, a draft rope attached to said drum, a frame pivoted to the same center as that on which the winding drum turns, a sliding draft rope guide suitably mounted to slide in said pivoted frame, a screw for moving said sliding draft rope guide across the face of the drum, mechanism for operating said screw, of an eye or connection on the frame of the machine to which the other end of the draft rope is adapted to be attached, and a draft equalizing device on the draft rope between said frame connection, and said sliding draft rope guide, all substantially as shown and described and for the purpose set forth.

29. In a stump extractor, the combination with a winding drum and mechanism for rotating it, a draft rope attached to said drum, a sliding draft rope guide with guide rollers mounted therein, between which guide rollers the draft rope passes, a screw for moving said sliding draft rope guide across the face of the drum, mechanism for operating said screw, of an eye or connection on the frame of the machine to which the other end of the draft rope is adapted to be attached, and a draft equalizing device on the draft rope between said frame connection and said sliding draft rope guide, all substantially as shown and described, and for the purpose set forth.

30. In a stump extractor, the combination with a winding drum and mechanism for rotating the same, a sliding draft rope guide and a screw for moving it, mechanism for operating said screw, a sliding anchor rope carrier, a screw for moving the same in correspondence with the advancement in the same direction of the said sliding draft rope guide, mechanism for operating the latter screw, of a draft rope with one of its ends connected to an eye or connection on the frame of the machine, and its other end attached to the winding drum, a draft equalizing pulley on the draft rope between said frame connection and said draft rope guide, all substantially as described, and for the purpose set forth.

31. In a stump extractor, the combination with a main frame and winding drum mounted thereon, a draft rope attached to said drum, a sliding anchor rope carrier and mechanism for moving it across the rear part of the drum in correspondence with the advancement in the same direction of the draft rope in its winding on said drum, or unwinding therefrom, of an engine for rotating the drum and a flexible conductor for connecting the engine with a source of power, all substantially as described and for the purpose set forth.

32. In a stump extractor, the combination with a main frame and a winding drum mounted therein, a draft rope attached to said drum, a sliding draft rope guide and mechanism for moving it across the face of the drum, a sliding anchor rope carrier and mechanism for moving the same across the rear part of the drum in correspondence with the advancement in the same direction of said sliding draft rope guide, of an engine for rotating the drum and a flexible conductor connecting said engine with a source of power, all substantially as described and for the purpose set forth.

33. In a stump extractor, the combination with a main frame and a winding drum mounted therein, mechanism for rotating the drum, a draft rope attached to said drum, a sliding anchor rope carrier and mechanism for moving it across the rear part of the drum in correspondence with the advancement in the same direction of the draft rope, in its winding on said drum, or unwinding therefrom, of an auxiliary drum or spool suitably mounted on said main frame, mechanism for rotating said spool or drum, and said auxiliary drum or spool adapted to have an auxiliary draft rope connected therewith to wind thereon, all substantially as described and for the purpose set forth.

34. In a stump extractor, the combination with a main frame and a winding drum mounted therein, a draft rope attached to said drum, a sliding draft rope guide, mechanism for moving the same across the face of the drum, said sliding draft rope guide suitably mounted to slide in a frame pivoted to the same center as that on which the winding drum turns, of an auxiliary drum or spool suitably mounted on said main frame, mechanism for rotating said auxiliary spool or drum and said auxiliary drum or spool adapted to have an auxiliary draft rope connected therewith to wind thereon, all substantially as shown and described and for the purpose set forth.

35. In a stump extractor, the combination with a main frame and a winding drum mounted therein, mechanism for rotating the drum and draft rope attached to said drum, a sliding draft rope guide and mechanism for moving it across the face of the drum, a sliding anchor rope carrier and mechanism for moving it across the rear part of the drum, in correspondence with the movement of the sliding draft rope guide, of an auxiliary drum or spool suitably mounted on said main frame, mechanism for rotating said auxiliary drum or spool, and said auxiliary drum or spool adapted to have an auxiliary draft rope connected therewith to wind thereon, all substantially as described and for the purpose set forth.

36. In a suitably anchored stump extractor, the combination with a main frame and draft mechanism mounted therein, means for operating the machine, of a quick speed pulley connected with a load or stump to be pulled, a draft rope attached to said draft mechanism, and said draft rope or an extention thereof, passing around said pulley and its free end secured to a stump or anchor, a quick speed rope attached to the frame or clevis of said pulley and also attached to the draft rope, said quick speed pulley rope being slightly longer than the distance between its end connections, in order to leave enough slack to permit the pulley or greater power to first slowly start the load or stump, before the quick speed rope with its direct, and more speedy pull, begins its part in finishing the operation, all substantially as described and for the purpose set forth.

37. In a suitably anchored stump extractor, the combination with a winding drum and mechanism for rotating the same, a draft rope attached to said drum, of a draft rope confining device for causing the coils of the draft rope to wind closely to each other on said drum, a screw for moving said draft rope confining device, mechanism for operating said screw, and an anti-friction wheel 240, all substantially as shown and described and for the purpose set forth.

JOHN C. SHARP.

Witnesses:
SILVENUS JOHN JEFFS,
CHARLES O. BOSSE.